US012153355B2

(12) United States Patent
Hamada et al.

(10) Patent No.: US 12,153,355 B2
(45) Date of Patent: Nov. 26, 2024

(54) CARTRIDGE USED IN IMAGE FORMING APPARATUS

(71) Applicant: CANON KABUSHIKI KAISHA, Tokyo (JP)

(72) Inventors: Takatoshi Hamada, Mishima (JP); Noriyuki Komatsu, Numazu (JP); Tetsuya Numata, Suntou-gun (JP); Daisuke Makiguchi, Izunokuni (JP); Naoya Asanuma, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/329,229

(22) Filed: Jun. 5, 2023

(65) Prior Publication Data

US 2023/0314982 A1 Oct. 5, 2023

Related U.S. Application Data

(63) Continuation of application No. 17/684,973, filed on Mar. 2, 2022, now Pat. No. 11,709,438, which is a continuation of application No. 16/722,319, filed on Dec. 20, 2019, now Pat. No. 11,294,299.

(30) Foreign Application Priority Data

Dec. 26, 2018 (JP) ................................ 2018-242687

(51) Int. Cl.
*G03G 15/08* (2006.01)

(52) U.S. Cl.
CPC ..... *G03G 15/0808* (2013.01); *G03G 15/0887* (2013.01)

(58) Field of Classification Search
CPC ...................... G03G 21/1885; G03G 21/1878
See application file for complete search history.

(56) References Cited

U.S. PATENT DOCUMENTS 5,708,912 A * 1/1998 Lee ..................... G03G 15/556 399/24
11,294,299 B2 * 4/2022 Hamada ............ G03G 21/1814
11,709,438 B2 * 7/2023 Hamada ............ G03G 21/1885 399/222

(Continued)

FOREIGN PATENT DOCUMENTS

JP 2016224221 A 12/2016

*Primary Examiner* — Sevan A Aydin
(74) *Attorney, Agent, or Firm* — Canon U.S.A., Inc. I.P. Division

(57) ABSTRACT

A cartridge configured to be attachable to an apparatus main body of an image forming apparatus includes a first unit including a photosensitive drum, a second unit attached to the first unit and including a developing roller, and a second frame member including a toner storage portion and including a toner reception port, the toner storage portion including a first end portion and a second end portion in a rotational axis direction of the photosensitive drum, the toner reception port provided in the first end portion, a toner container configured to be attachable to the second unit, the toner container including a toner discharge port configured to discharge the toner to the toner storage portion through the toner reception port, and a memory, the memory provided in an end portion of the cartridge on the same side as the second end portion of the toner storage portion.

9 Claims, 26 Drawing Sheets

(56) References Cited

U.S. PATENT DOCUMENTS

| | | | | |
|---|---|---|---|---|
| 2004/0095454 | A1* | 5/2004 | Maeda | G03G 15/0152 347/116 |
| 2008/0240774 | A1* | 10/2008 | Fukamachi | G03G 15/0865 399/111 |
| 2008/0267666 | A1* | 10/2008 | Shirokoshi | G03G 21/1647 399/222 |
| 2013/0259532 | A1* | 10/2013 | Kubota | G03G 15/0886 399/254 |
| 2016/0054682 | A1* | 2/2016 | Inui | G03G 15/0886 399/260 |

* cited by examiner

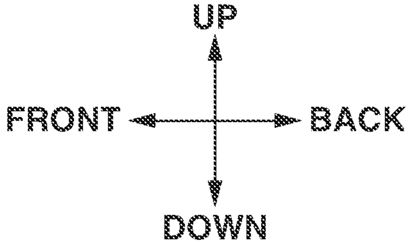
FIG.16A
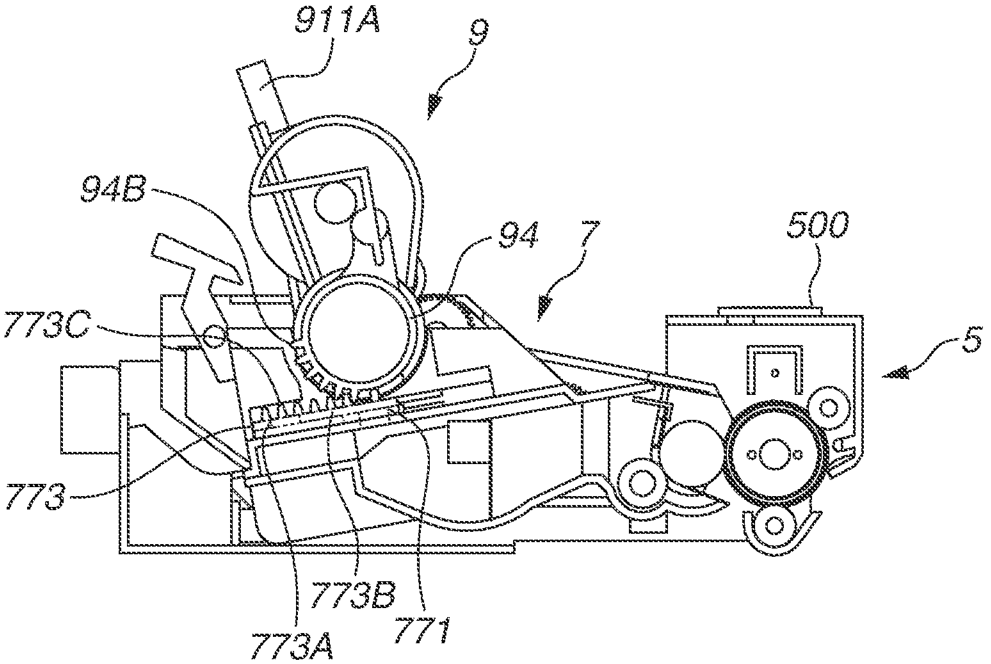
FIG.16B
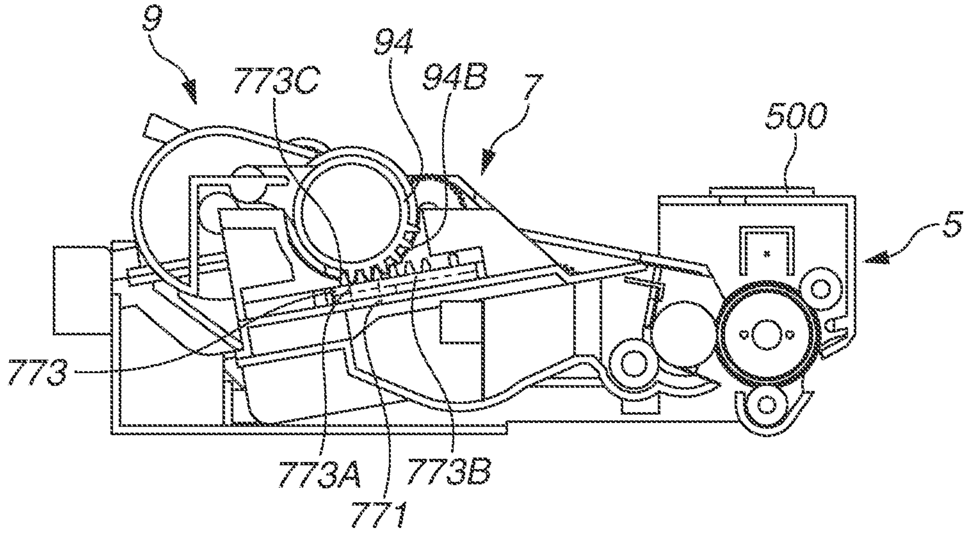

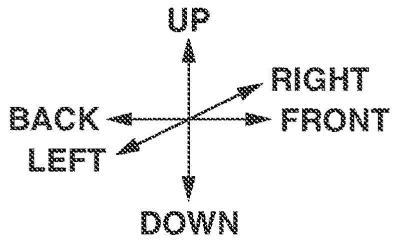
FIG.18A
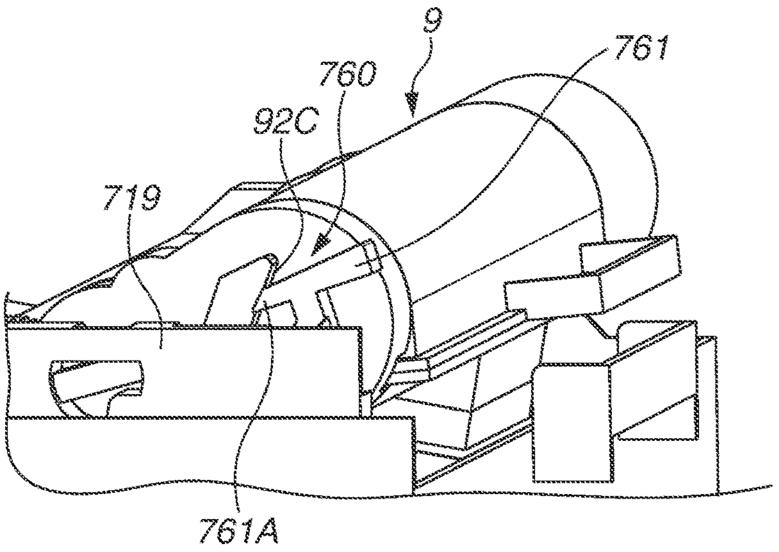
FIG.18B
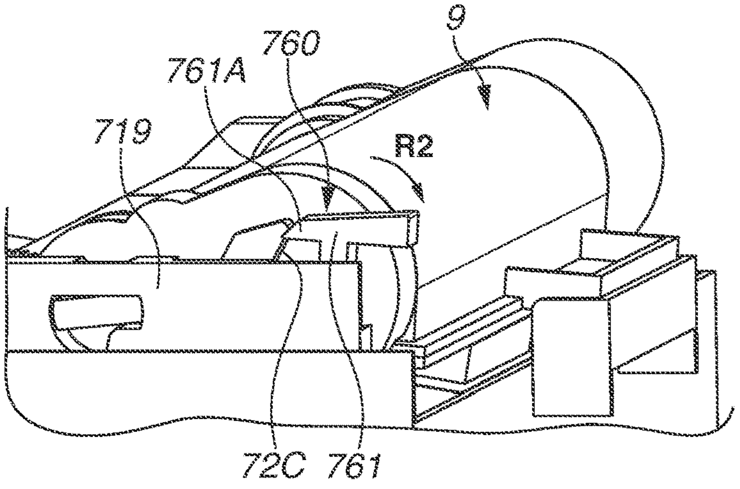
FIG.18C
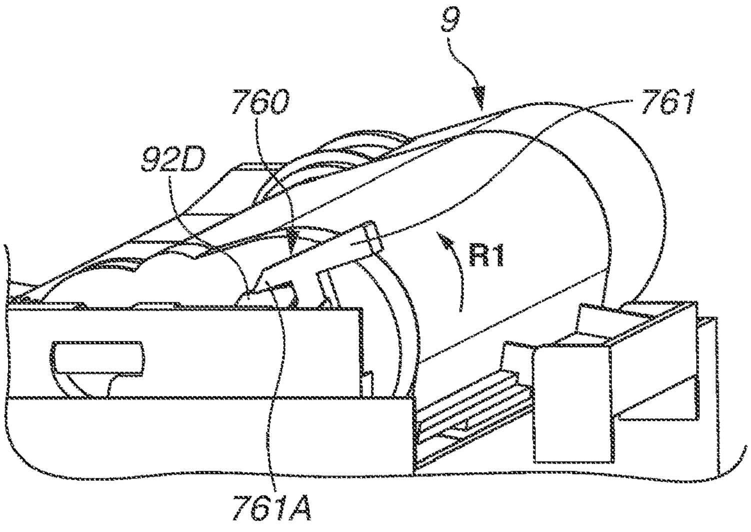

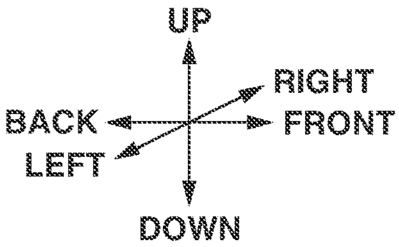
FIG.19A
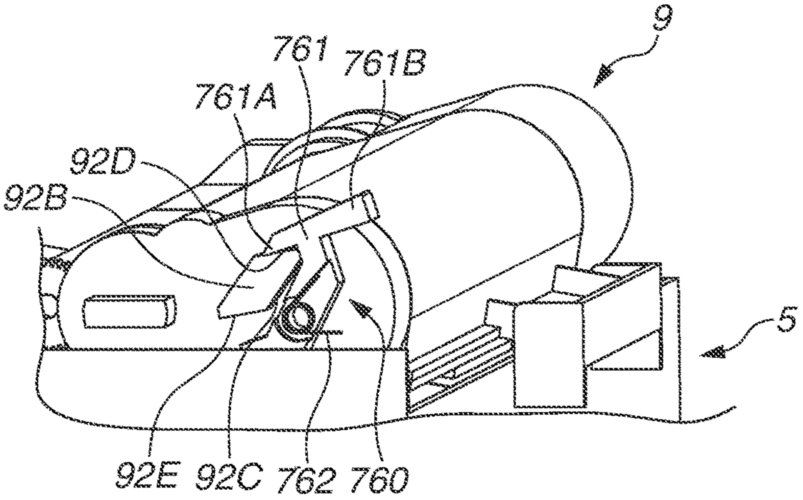
FIG.19B
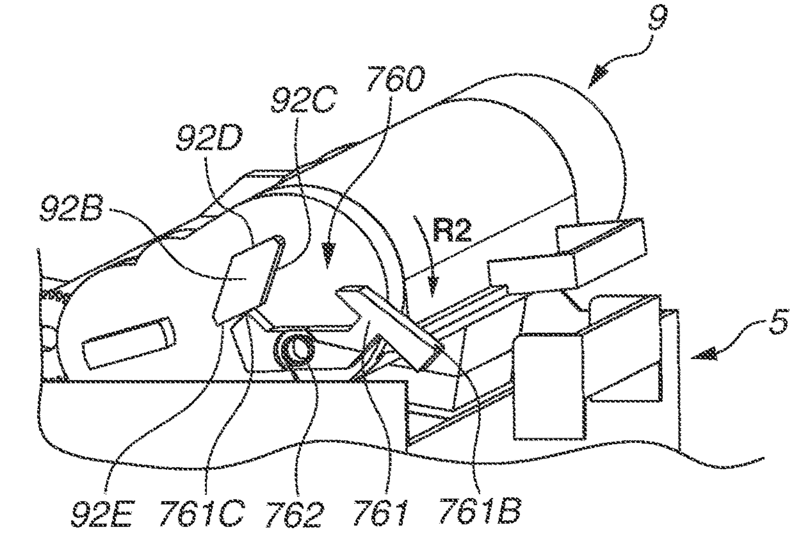
FIG.19C
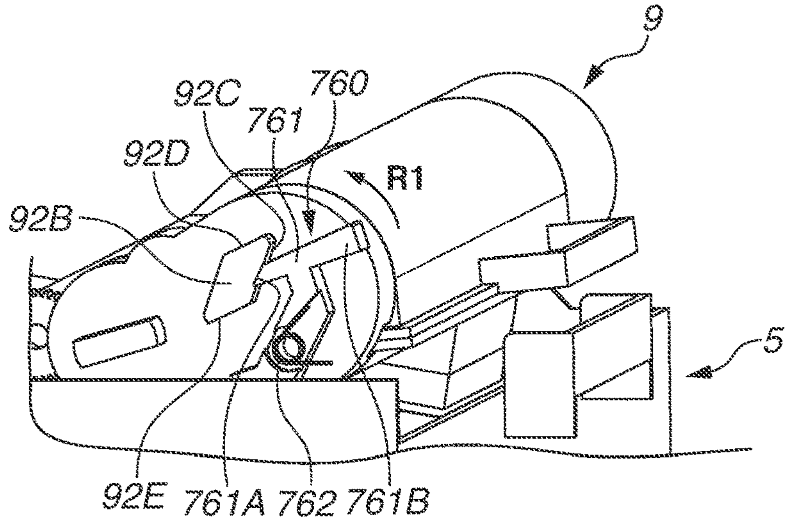

CARTRIDGE USED IN IMAGE FORMING APPARATUS

CROSS-REFERENCE TO RELATED APPLICATIONS

The present application is a continuation of U.S. patent application Ser. No. 17/684,973, filed Mar. 2, 2022, which is a continuation of U.S. patent application Ser. No. 16/722,319, filed on Dec. 20, 2019, and issued as U.S. Pat. No. 11,294,299 on Apr. 5, 2022, which claims priority from Japanese Patent Application No. 2018-242687 filed Dec. 26, 2018, which are hereby incorporated by reference herein in their entireties.

BACKGROUND

Field of the Disclosure

The present disclosure relates to a cartridge attachable to and detachable from an electrophotographic image forming apparatus.

Description of the Related Art

In an electrophotographic image forming apparatus (a laser beam printer, a light-emitting diode (LED) printer, or a copying machine), a configuration is widely employed in which some components of the image forming apparatus are integrated into a cartridge so that the cartridge can be replaced. Japanese Patent Application Laid-Open No. 2018-10243 discusses a cartridge in which a developing unit is provided in a photosensitive unit including a photosensitive drum, and a toner container that stores toner is attachable to and detachable from the developing unit.

In a case where a toner container is configured to be attachable to and detachable from a developing unit as in the cartridge of Japanese Patent Application Laid-Open No. 2018-10243, toner may be scattered by the operation of attaching and detaching the toner container to and from the developing unit. Meanwhile, a memory that stores information regarding a cartridge may be provided in the cartridge, and an image forming apparatus may control an image forming process based on the information stored in the memory. In a case where a memory is provided in the cartridge of Japanese Patent Application Laid-Open No. 2018-10243, it is possible that the memory becomes soiled by scattered toner, and an apparatus main body cannot read information in the memory provided in the cartridge.

SUMMARY

According to an aspect of the present disclosure, a cartridge configured to be attachable to and detachable from an apparatus main body of an image forming apparatus includes a first unit including a photosensitive drum and a first frame member configured to support the photosensitive drum so that the photosensitive drum is rotatable, a second unit attached to the first unit and including a developing roller configured to supply toner to the photosensitive drum, and a second frame member including a toner storage portion configured to store the toner to be borne on the developing roller and including a toner reception port, a toner container configured to be attachable to and detachable from the second unit and store the toner, the toner container including a toner discharge port configured to discharge the toner to the toner storage portion through the toner reception port, and a memory configured to store information, wherein the toner storage portion includes a first end portion and a second end portion on the opposite side of the first end portion in a rotational axis direction of the photosensitive drum, wherein the toner reception port is provided in the first end portion of the toner storage portion, and wherein the memory is provided in an end portion of the cartridge on the same side as the second end portion of the toner storage portion.

Further features of the present disclosure will become apparent from the following description of exemplary embodiments with reference to the attached drawings.

BRIEF DESCRIPTION OF THE DRAWINGS

FIGS. 16A and 16B are diagrams illustrating an operation of opening and closing a reception side shutter of the developing unit according to the first exemplary embodiment.

FIGS. 18A, 18B, and 18C are diagrams illustrating an operation of a lift mechanism in a process of attaching the toner container according to the first exemplary embodiment.

FIGS. 19A, 19B, and 19C are diagrams illustrating the operation of the lift mechanism in a process of shifting the toner container according to the first exemplary embodiment to a lifted-up state.

DESCRIPTION OF THE EMBODIMENTS

Figure 1:
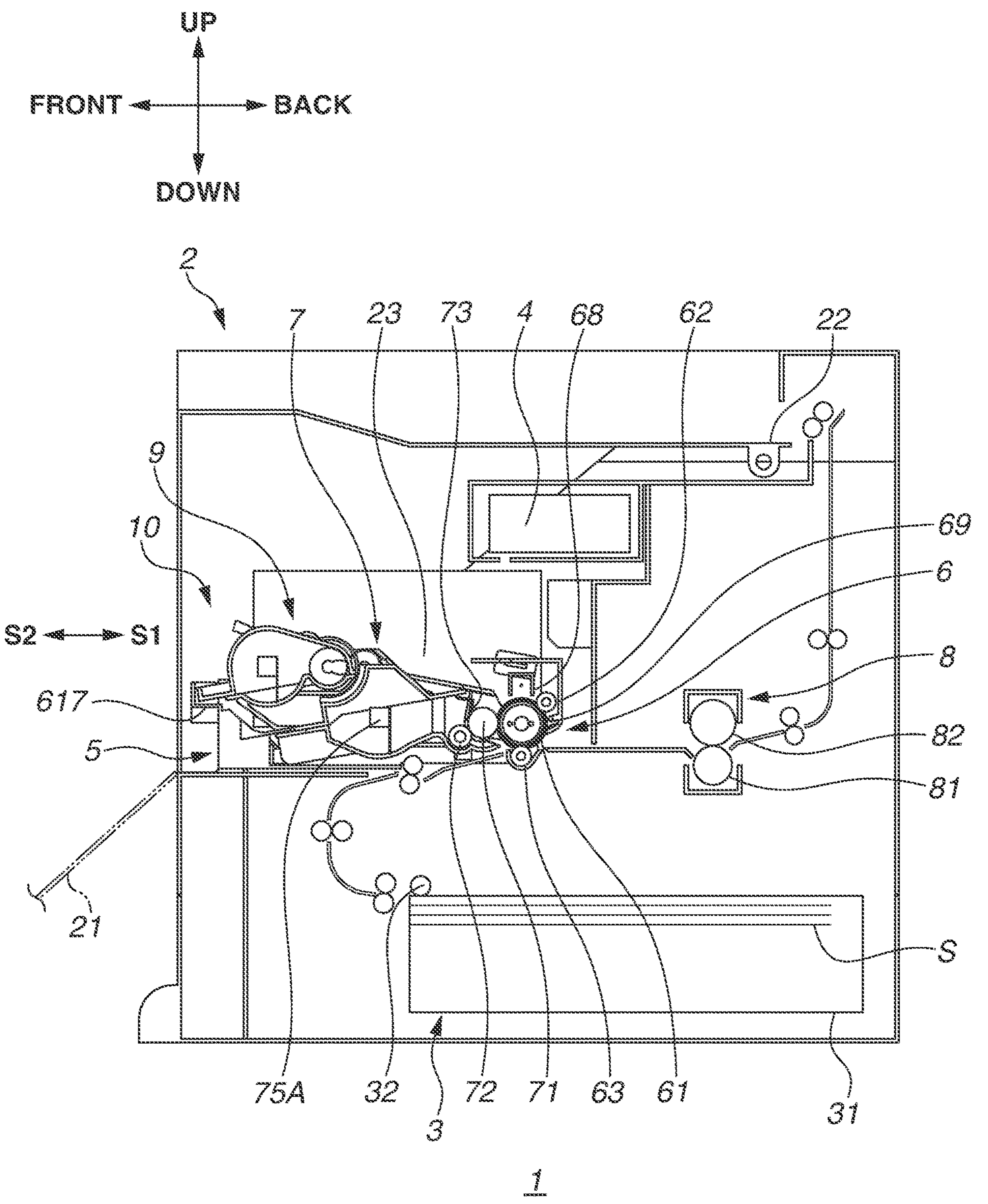
FIG. 1 is a cross-sectional view of an image forming apparatus including a cartridge according to a first exemplary embodiment.

With reference to the drawings where appropriate, a first exemplary embodiment of the present disclosure is described in detail. In the following description, directions based on a user using an image forming apparatus 1 are defined. That is, the front surface side of the image forming apparatus 1 is defined as "front", the back surface side is defined as "back", the upper surface (top surface) side is defined as "up", and the lower surface (bottom surface) side is defined as "down". The left side of the image forming apparatus 1 when viewed from the front surface side is defined as "left", and the right side is defined as "right". Also regarding a process cartridge 5 and a toner container 9, directions are defined similarly to the image forming apparatus 1 on the assumption that the process cartridge 5 and the toner container 9 are in the same orientations as in the state where the process cartridge 5 and the toner container 9 are attached to the image forming apparatus 1. Directions in each drawing are defined by arrows illustrated in the drawing. A front-back direction, an up-down direction, and a left-right direction indicated by the arrows are directions orthogonal to one another. These directions indicate the same directions in all the drawings. The up-down direction is parallel to the vertical direction, and the left-right direction and the front-back direction are parallel to the horizontal direction. The left-right direction is parallel to the rotational axis direction of a photosensitive drum 61 and the rotational axis direction of a developing roller 71. A component obtained by attaching a developing unit 7 to a photosensitive unit 6 and integrating the developing unit 7 and the photosensitive unit 6 is referred to as the "process cartridge 5". An insertion direction (attachment direction) S1 in which the process cartridge 5 is attached to an apparatus main body 2, and a detachment direction S2 in which the process cartridge 5 is detached from the apparatus main body 2 are parallel to the front-back direction and orthogonal to the left-right direction and the up-down direction. In the process cartridge 5, the toner container 9 that supplies toner to the developing unit 7 is provided to be attachable to and detachable from the process cartridge 5. A component obtained by attaching the toner container 9 to the process cartridge 5 and integrating the toner container 9 and the process cartridge 5 is referred to as a "cartridge 10".

<Overall Configuration of Image Forming Apparatus>

FIG. 1 is a cross-sectional view of the image forming apparatus 1 to which the cartridge 10 is attached. This cross section is parallel to the up-down direction and the front-back direction. As illustrated in FIG. 1, the image forming apparatus 1 mainly includes in the apparatus main body 2 a sheet feeding unit 3 that supplies a sheet S (a recording material), an exposure device 4, the cartridge 10 that transfers a toner image onto the sheet S, and a fixing device 8 that thermally fixes the toner image transferred onto the sheet S.

The sheet feeding unit 3 is provided in a lower portion of the apparatus main body 2 and mainly includes a sheet feeding tray 31 and a sheet feeding mechanism 32. The sheet S stored in the sheet feeding tray 31 is supplied by the sheet feeding mechanism 32 to the cartridge 10 (between the photosensitive drum 61 and a transfer roller 63).

The exposure device 4 is placed in an upper portion of the apparatus main body 2 and includes a laser emitting unit (not illustrated) and a polygon mirror, a lens, and a mirror (illustrated without reference signs). In the exposure device 4, laser light based on image data emitted from the laser emitting unit is scanned at high speed on the surface of the photosensitive drum 61, thereby exposing the surface of the photosensitive drum 61.

The cartridge 10 is placed below the exposure device 4. The cartridge 10 is configured to be attached to the apparatus main body 2 by inserting the cartridge 10 into an accommodation portion 23 of the apparatus main body 2 in the insertion direction S1 through an opening created by opening a door (opening/closing member) 21 (indicated by a two-dot chain line in FIG. 1) provided in the apparatus main body 2. To detach the cartridge 10 from the apparatus main body 2, the cartridge 10 is taken out by moving the cartridge 10 in the detachment direction S2.

The cartridge 10 includes the process cartridge 5 and the toner container 9. The process cartridge 5 mainly includes the photosensitive unit 6 and the developing unit 7. The photosensitive unit 6 mainly includes the photosensitive drum 61, a corona charger 68, a pre-exposure unit 69, a collection roller 62, and the transfer roller 63. The developing unit 7 is configured to be detachably attached to the photosensitive unit 6. The developing unit 7 mainly includes the developing roller 71, a supply roller 72, a layer thickness regulation blade 73, a toner storage portion 74 that stores toner, and a first agitator 75A provided in the toner storage portion 74.

<Image Forming Process>

Figure 5:
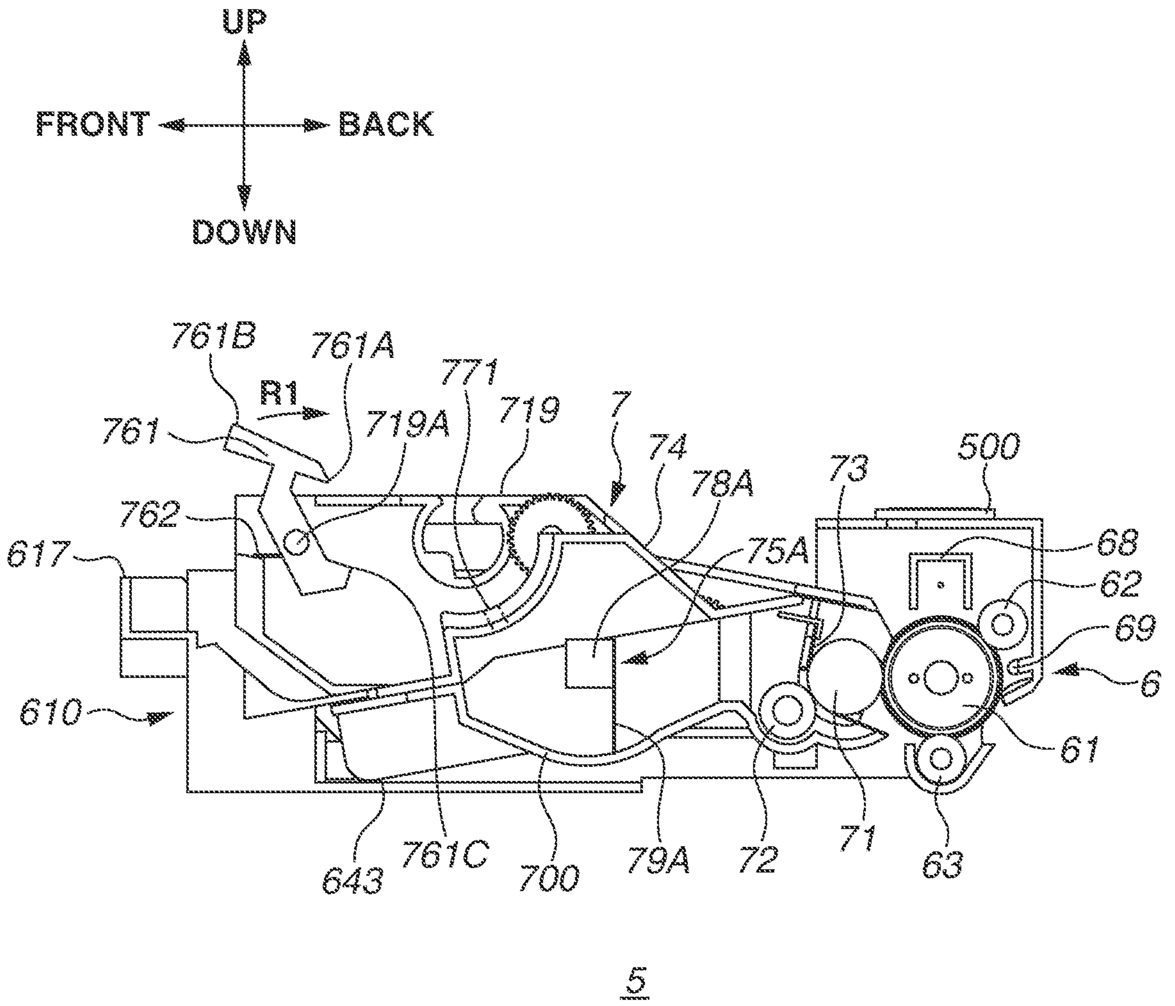
FIG. 5 is a cross-sectional view of a process cartridge according to the first exemplary embodiment.

Next, an image forming process using the process cartridge 5 is described. FIG. 5 is a cross-sectional view of the process cartridge 5. The photosensitive drum 61 is rotationally driven during the execution of the image forming process. The surface of the photosensitive drum 61 is first uniformly charged by the corona charger 68 (a charging member) and then exposed to laser light corresponding to image data emitted from the exposure device 4 (FIG. 1), thereby forming an electrostatic latent image corresponding to the image data on the photosensitive drum 61.

Meanwhile, toner in the toner storage portion 74 is agitated by the first agitator 75A and then supplied to the developing roller 71 via the supply roller 72. Then, the toner supplied to the developing roller 71 enters between the developing roller 71 and the layer thickness regulation blade 73 and is borne as a thin layer having a uniform thickness on the developing roller 71.

The toner borne on the developing roller 71 is supplied to the electrostatic latent image formed on the photosensitive drum 61. Consequently, the toner is attached to the electrostatic latent image and visualized, thereby forming a toner image on the photosensitive drum 61. Then, the sheet S is conveyed between the photosensitive drum 61 and the transfer roller 63, and the toner image on the photosensitive drum 61 is transferred onto the sheet S.

Next, as illustrated in FIG. 1, the fixing device 8 is placed behind the process cartridge 5 and mainly includes a heating roller 81 and a pressure roller 82. The sheet S onto which the toner image is transferred passes through the fixing device 8. At this time, the sheet S is heated and pressurized between the heating roller 81 and the pressure roller 82, thereby fixing the toner image to the sheet S. The sheet S having passed through the fixing device 8 is discharged onto a sheet discharge tray 22.

The corona charger 68 described above with reference to FIG. 5 is a charging unit that charges the surface of the photosensitive drum 61 in a noncontact manner. The pre-exposure unit 69 includes a light-emitting diode as a light source and a light guide as a light guiding member. The pre-exposure unit 69 causes the light guide to guide light emitted from the light-emitting diode and irradiates the surface of the photosensitive drum 61 with the light. A current to be supplied to the light-emitting diode is supplied from the apparatus main body 2. The irradiation with the light by the pre-exposure unit 69 eliminates static from the surface of the photosensitive drum 61. To the collection roller 62, a predetermined voltage is applied by the apparatus main body 2, whereby the collection roller 62 collects foreign substances, such as paper dust and dirt, and toner that are attached to the surface of the photosensitive drum 61.

<Process Cartridge>

Next, the units of the process cartridge 5 are described. As described above, the process cartridge 5 includes the photosensitive unit 6 (a first unit) and the developing unit 7 (a second unit).

<Developing Unit>

Figure 2:
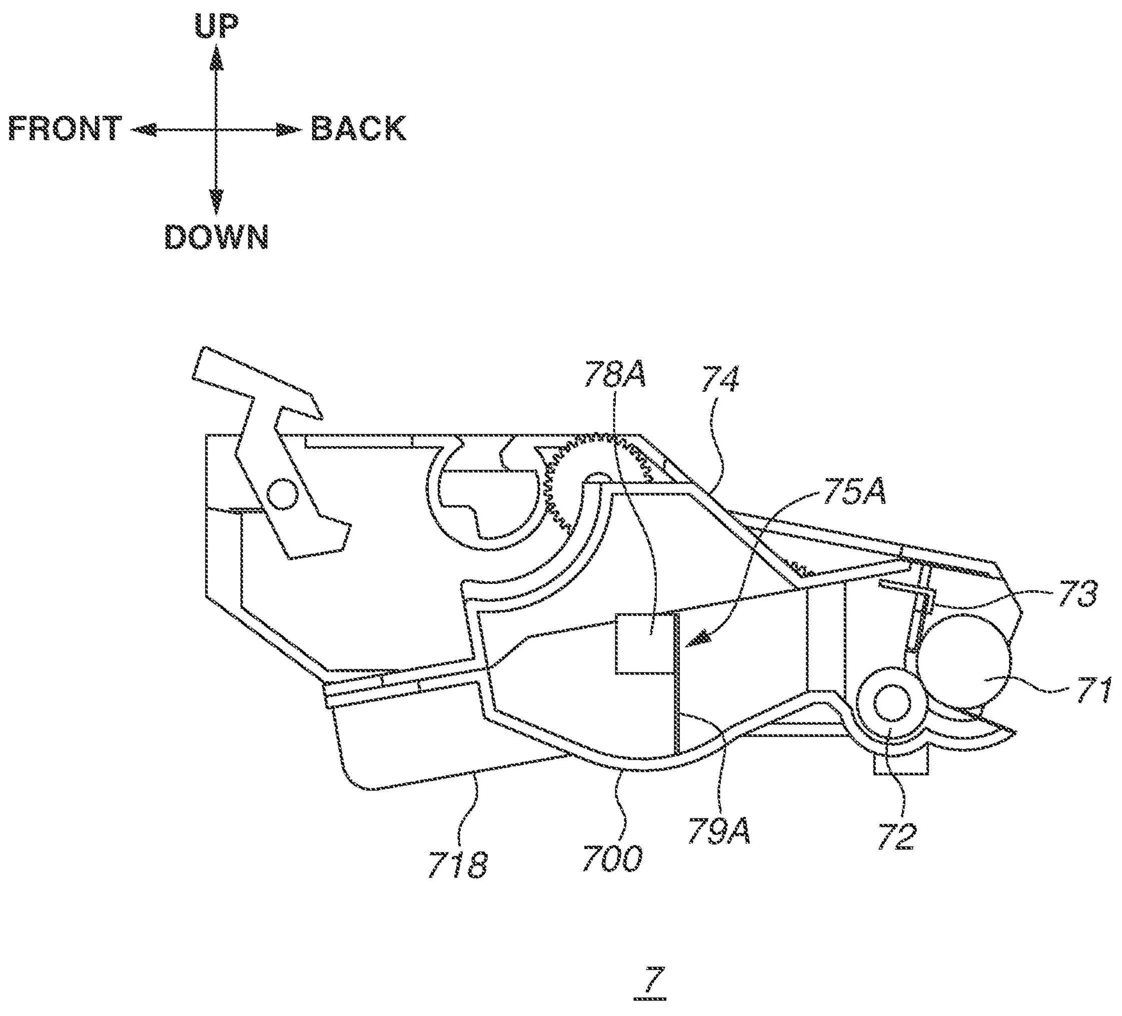
FIG. 2 is a cross-sectional view of a developing unit according to the first exemplary embodiment.
Figure 3:
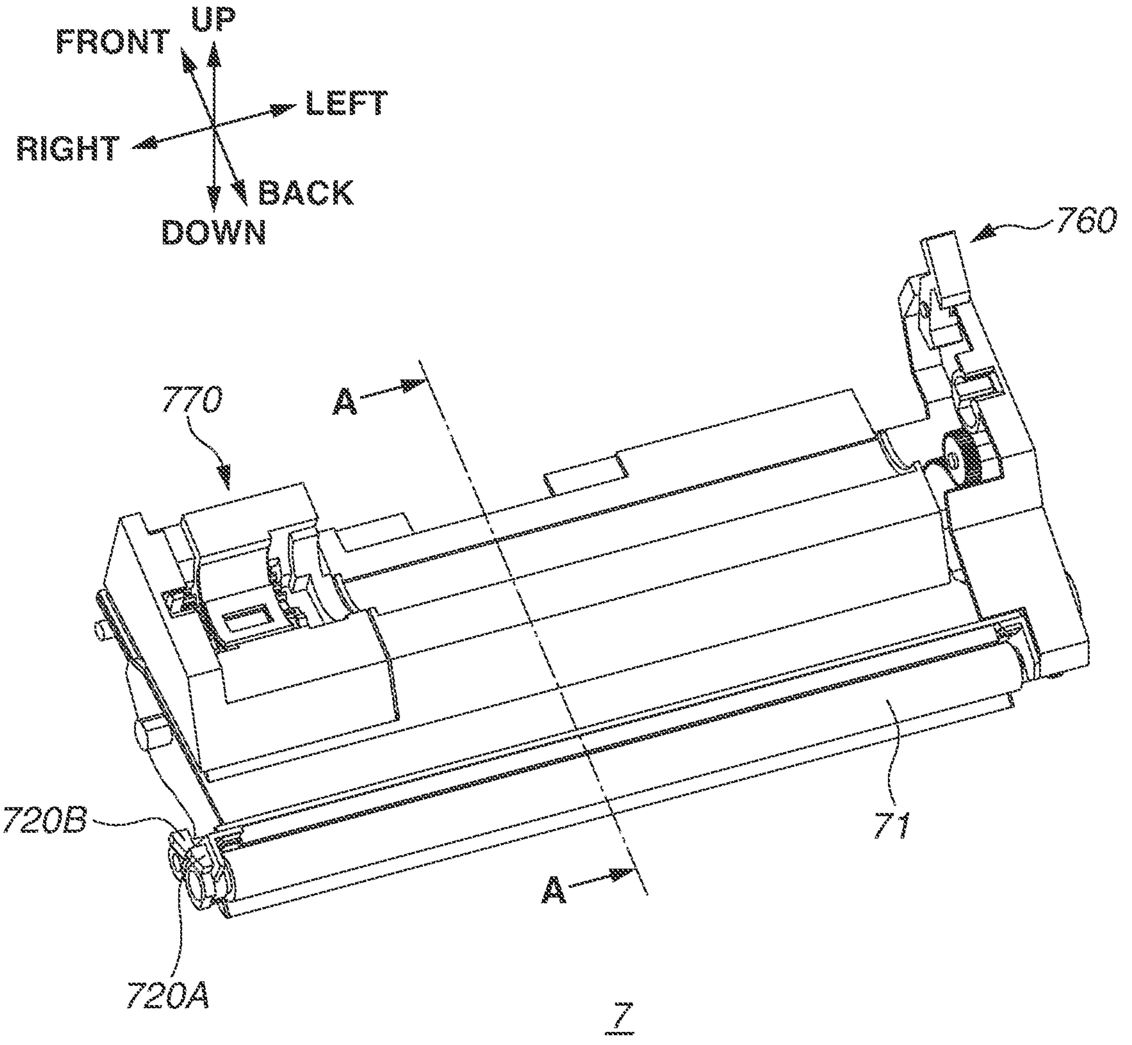
FIG. 3 is a perspective view of the developing unit according to the first exemplary embodiment.
Figure 4:
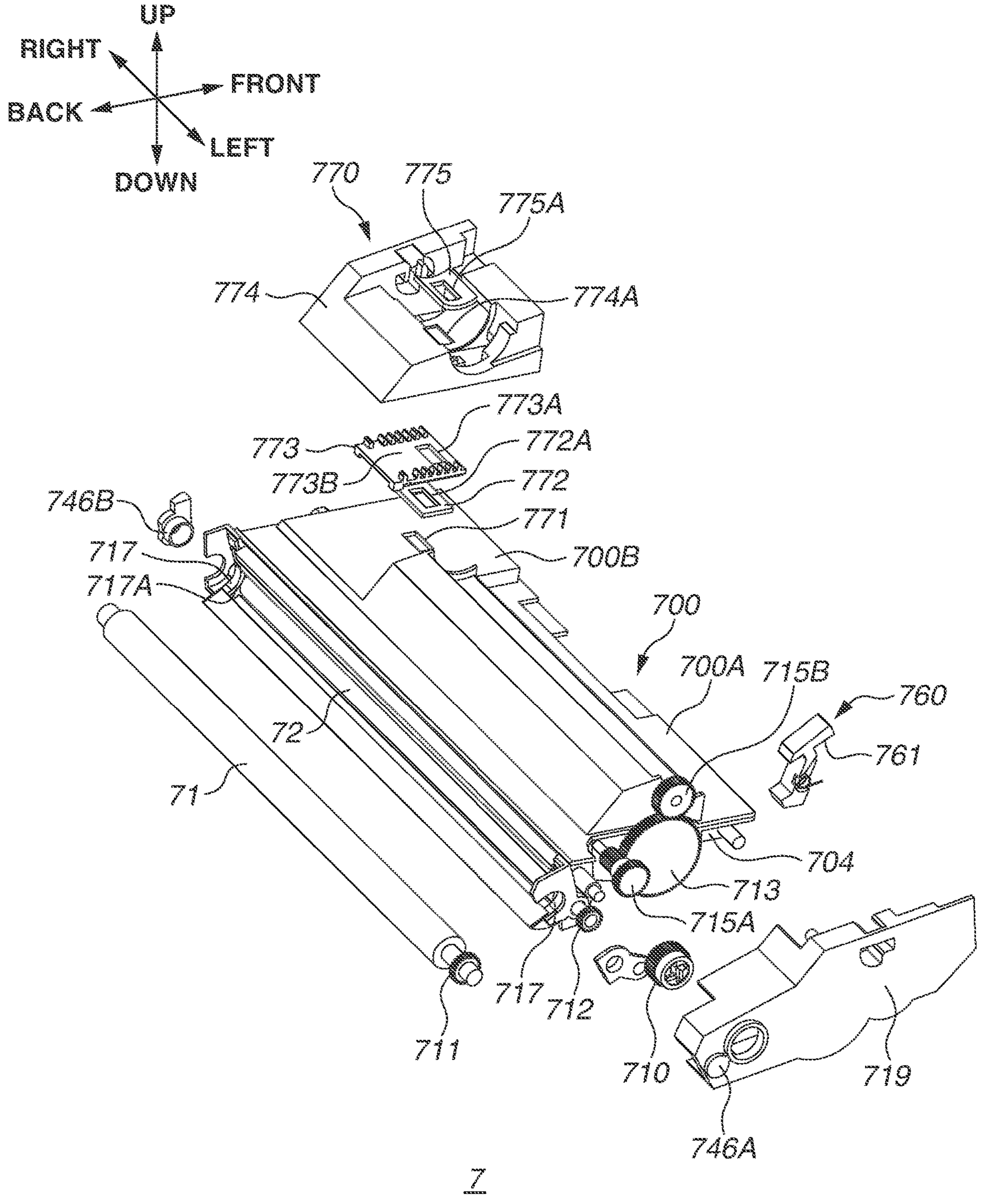
FIG. 4 is an exploded perspective view of the developing unit according to the first exemplary embodiment.
Figure 6:
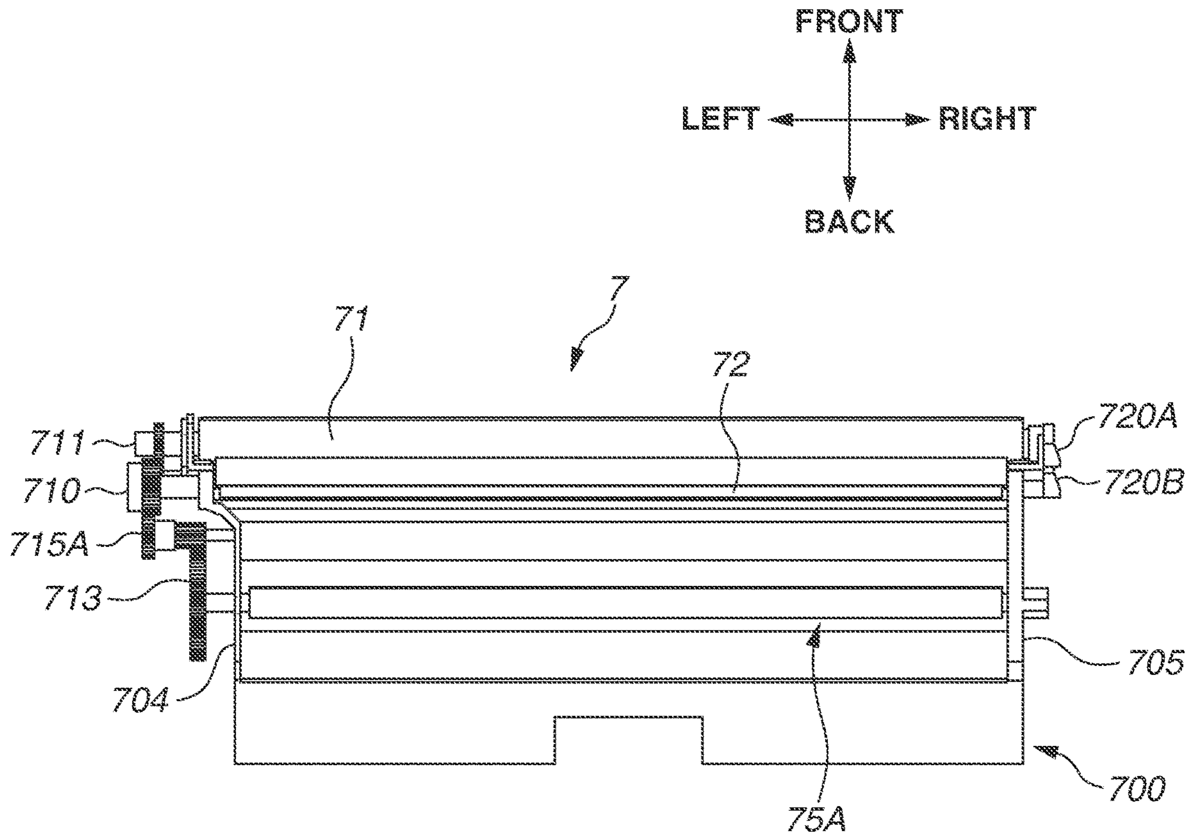
FIG. 6 is a top view of the developing unit according to the first exemplary embodiment.
Figure 11:
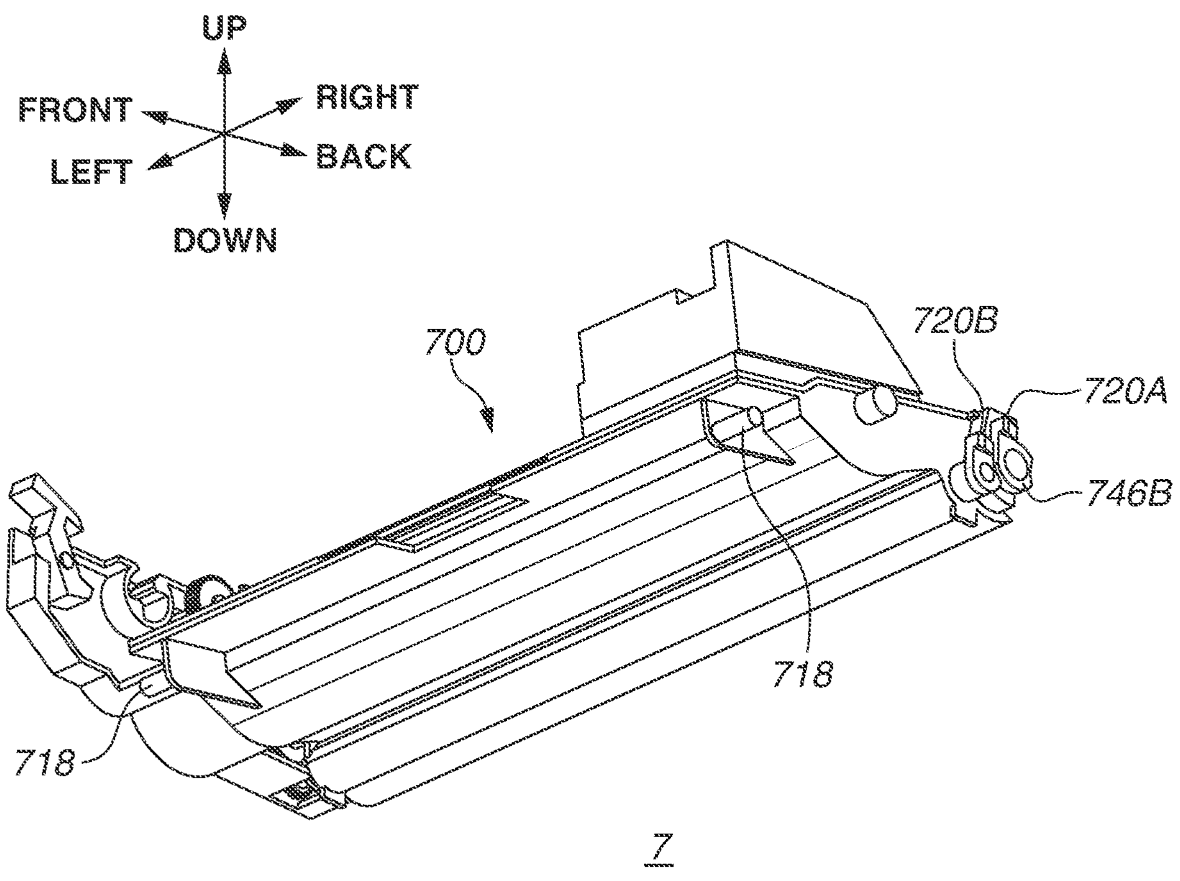
FIG. 11 is a bottom perspective view of the developing unit according to the first exemplary embodiment.

First, the configuration of the developing unit 7 is described. FIG. 2 is a cross-sectional view of the developing unit 7 along an A-A cross section in FIG. 3. The A-A cross section is parallel to the up-down direction and the front-back direction. FIG. 3 is a perspective view of the developing unit 7. FIG. 4 is an exploded perspective view of the developing unit 7. FIG. 6 is a top view of the developing unit 7 and illustrates the state where the top surface of a housing 700 is removed for illustrative purposes. FIG. 11 is a bottom perspective view of the developing unit 7.

In the developing unit 7, as illustrated in FIG. 2, the developing roller 71 is rotatably supported at one end at the back of the housing 700. In the following description, in the configuration of the developing unit 7, the rotational axis direction of the developing roller 71 is referred to as an "axial direction".

As illustrated in FIGS. 4 and 6, both ends of each of the developing roller 71, the supply roller 72, and the first agitator (first agitation member) 75A are rotatably supported by a left side wall 704 and a right side wall 705 of the housing 700 (a second frame member). To the left of the left side wall 704 of the housing 700, a developing coupling 710, a developing roller gear 711, a supply roller gear 712, a first agitator gear 713, and idle gears 715A and 715B are provided. The developing roller gear 711 is fixed to an end portion of the developing roller 71, and the supply roller gear 712 is fixed to an end portion of the supply roller 72. The first agitator gear 713 is fixed to an end portion of an agitation bar 78A (see FIG. 5) of the first agitator 75A.

To the developing unit 7, the toner container 9 that supplies toner can be attached. The toner storage portion 74 includes a toner reception unit 770 that stores toner to be borne on the developing roller 71 and receives toner supplied by the toner container 9. The toner storage portion 74 further includes a lift mechanism 760 that retains and lifts up the toner container 9.

As illustrated in FIG. 3, in the developing unit 7, a first electrical contact 720A is provided which is electrically connected to the developing roller 71 and to which a voltage to be applied to the developing roller 71 is supplied. Further, a second contact 720B is provided which is electrically connected to the supply roller 72 and to which a voltage to be applied to the supply roller 72 is supplied. These electrical contacts come into contact with power supply contacts (not illustrated) provided in the apparatus main body 2, thereby supplying power to the developing roller 71 and the supply roller 72.

Next, with reference to FIG. 4, the driving configuration of the developing unit 7 is described. In conjunction with the operation of closing the door 21 (FIG. 1) provided in the apparatus main body 2, a development drive transmission member (not illustrated) provided in the apparatus main body 2 moves to the position where the development drive transmission member engages with the developing coupling 710. Conversely, in conjunction with the operation of opening the door 21 (FIG. 1), the development drive transmission member (not illustrated) moves to the position where the development drive transmission member releases the engagement with the developing coupling 710.

After the door 21 (FIG. 1) is closed, and if the apparatus main body 2 operates, the development drive transmission member (not illustrated) transmits (inputs) a driving force to the developing coupling 710 as a driving force reception member. Next, a gear provided on the peripheral surface of the developing coupling 710 enables the developing roller 71 to rotate through the developing roller gear 711, and the supply roller 72 to rotate through the supply roller gear 712. The development drive transmission member (not illustrated) is configured to allow a positional shift of the developing coupling 710 in a predetermined range and transmit a driving force to the developing coupling 710. The movements of the developing coupling 710, the developing roller gear 711, and the supply roller gear 712 in the axial direction are restricted by a side holder 719 attached to the housing 700.

As illustrated in FIG. 5, the developing unit 7 employs the first agitator 75A and agitates toner in the toner storage portion 74 so that the toner can be used up. The first agitator 75A includes the agitation bar 78A and an agitation sheet 79A. The first agitator 75A is configured to rotate by causing the first agitator gear 713 to receive a driving force from the developing coupling 710 through the idle gear 715A (see FIG. 6). Toner near the first agitator 75A in the toner storage portion 74 is agitated by the first agitator 75A, then supplied to the supply roller 72 side, and further supplied to the developing roller 71 by the supply roller 72.

<Photosensitive Unit>

Figure 7:
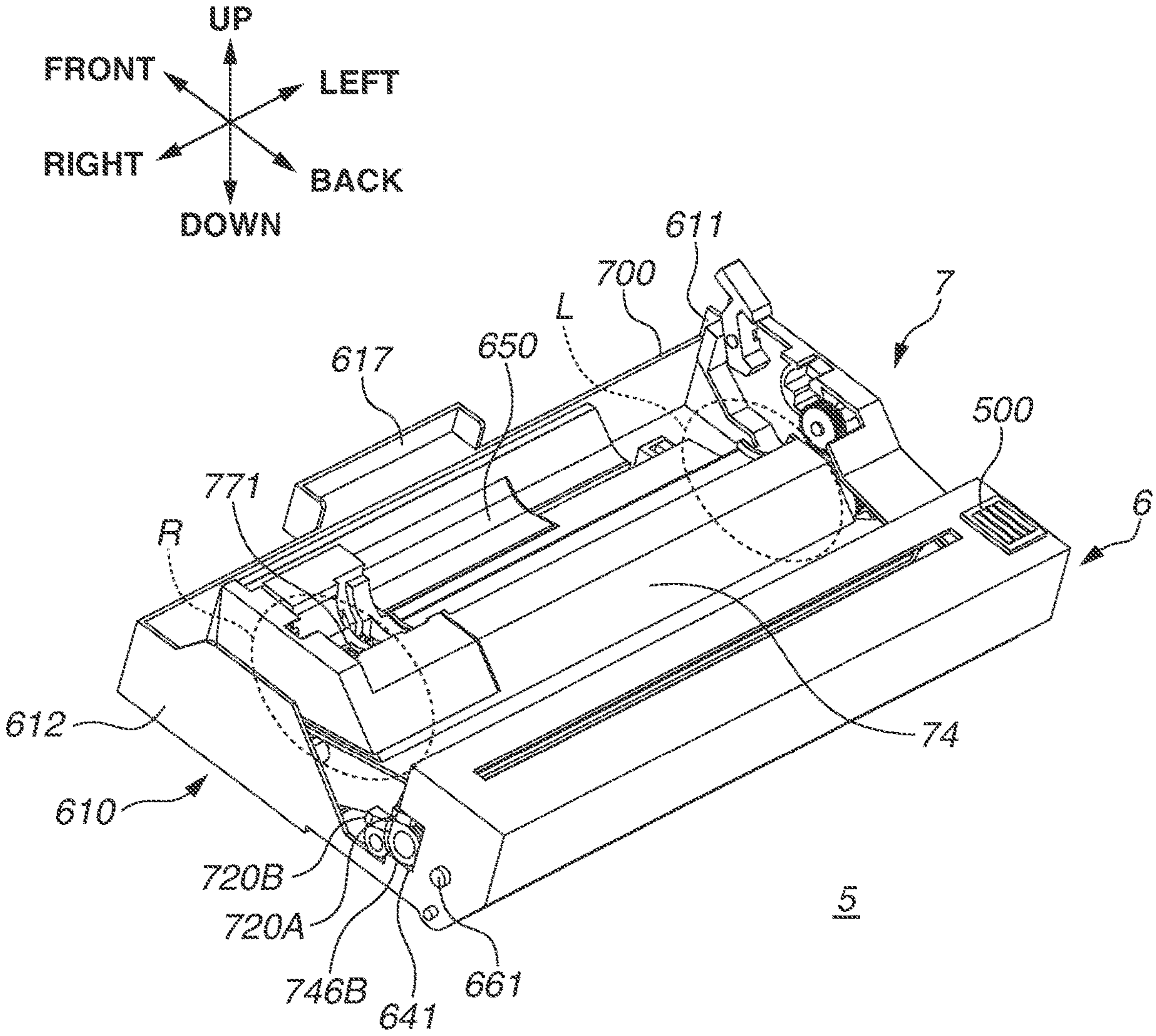
FIG. 7 is a perspective view of the process cartridge according to the first exemplary embodiment.
Figure 8:
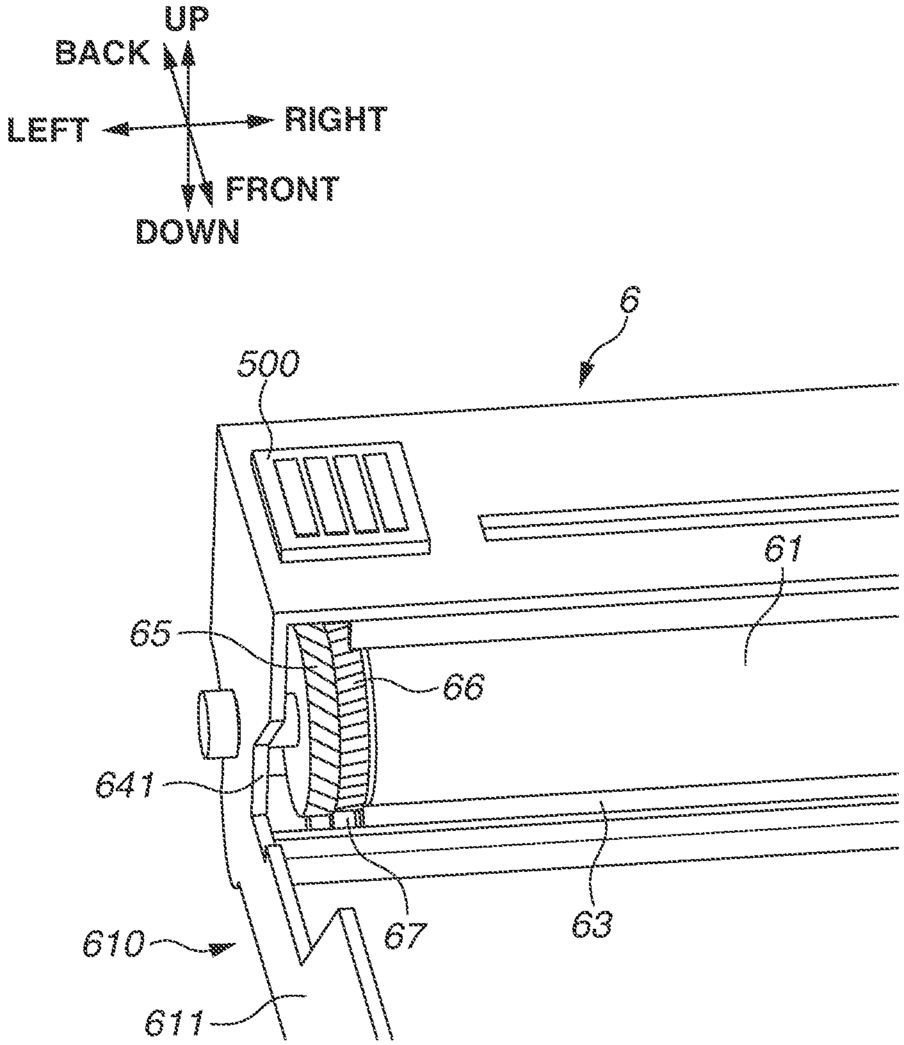
FIG. 8 is a partial perspective view of a photosensitive unit according to the first exemplary embodiment.
Figure 9:
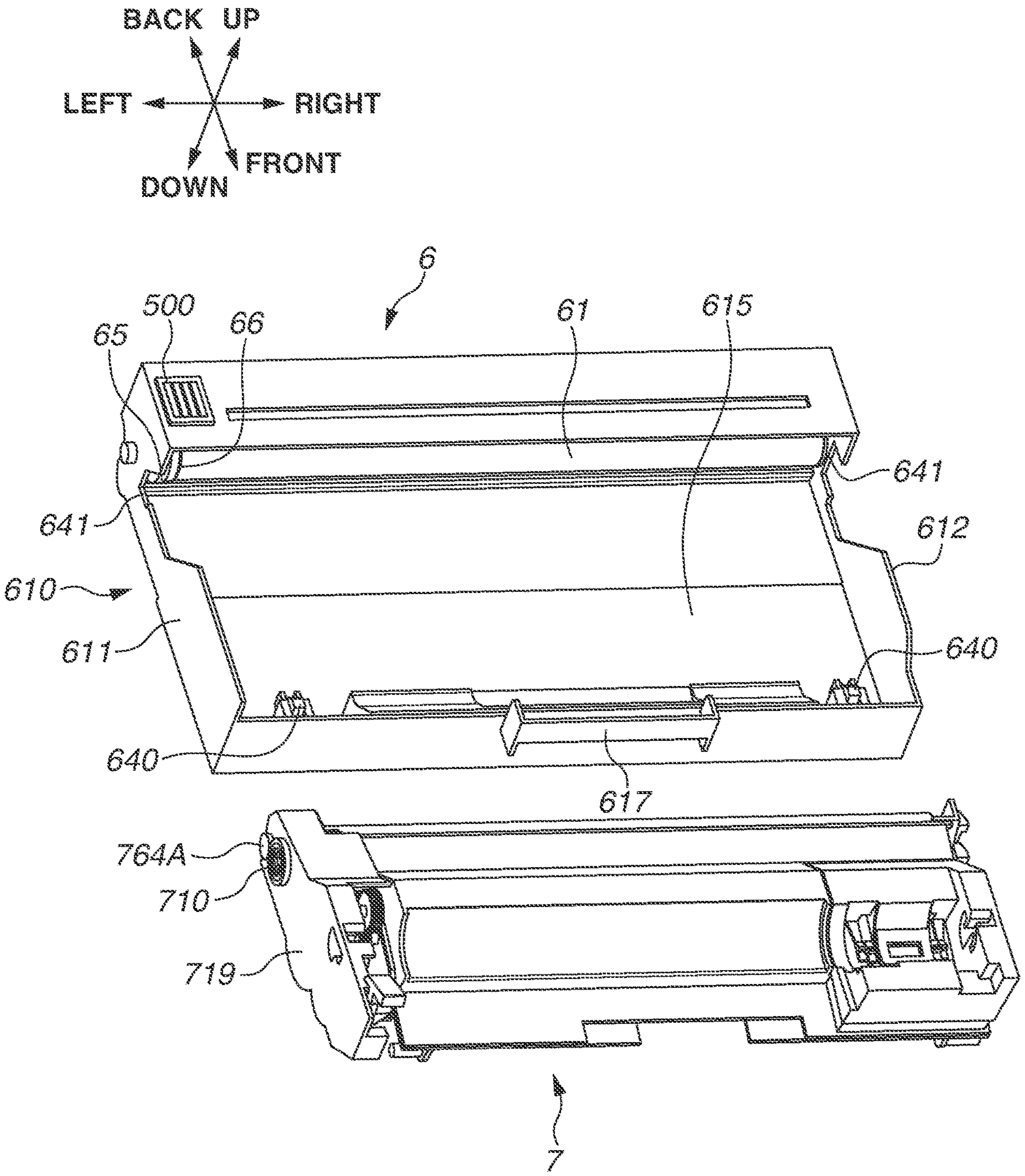
FIG. 9 is a perspective view of the developing unit and the photosensitive unit according to the first exemplary embodiment.
Figure 10:
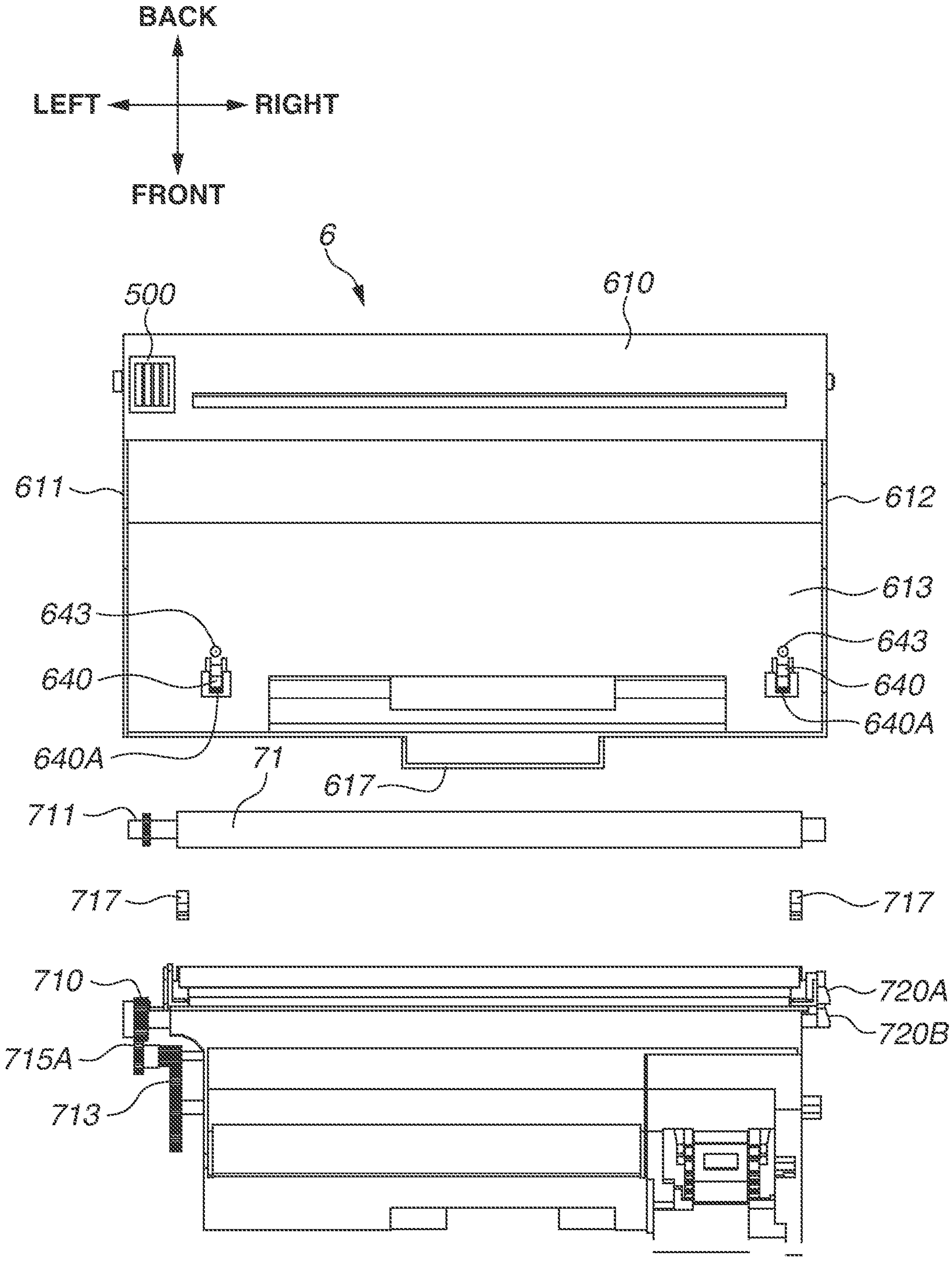
FIG. 10 is a top view illustrating placement relationships in a left-right direction among the photosensitive unit, the developing unit, a developing roller, and an end portion seal according to the first exemplary embodiment.

Next, the detailed configuration of the photosensitive unit 6 is described. FIG. 7 is a perspective view of the process cartridge 5. FIG. 8 is a partial perspective view of the photosensitive unit 6. FIG. 9 is a perspective view of the developing unit 7 and the photosensitive unit 6. FIG. 10 is a top view illustrating the placement relationships in the left-right direction among the photosensitive unit 6, the developing unit 7, and the developing roller 71.

As illustrated in FIG. 9, the photosensitive unit 6 includes a frame 610 (a first frame member) including a left side wall 611 and a right side wall 612 as a pair, and the photosensitive drum 61 rotatably supported by the frame 610. In the front-back direction intersecting the axis direction of the photosensitive drum 61, the photosensitive drum 61 is supported by one end portion of the frame 610 at its back, and a grip portion 617 is provided in the other end portion of the frame 610 at its front. In the front-back direction, an attaching portion 615 to which the developing unit 7 can be attached is provided between the photosensitive drum 61 and the grip portion 617. In the frame 610, pressing members 640 are provided that press the developing unit 7 so that the developing roller 71 comes into contact with the photosensitive drum 61.

Then, as illustrated in FIG. 7, the toner storage portion 74 of the developing unit 7 attached to the attaching portion 615 is placed between the left side wall 611 and the right side wall 612 in the left-right direction.

As illustrated in FIG. 9, in the left side wall 611 and the right side wall 612 of the frame 610, reception portions 641 that receive rotating shaft reception members 746A and 746B (FIG. 7) of the developing roller 71 are formed in front of the photosensitive drum 61. Each of the reception portions 641 is an approximately U-shaped recessed portion of which the front side is open. A rotating shaft (not illustrated) of the developing roller 71 is inserted into the reception portions 641. The reception portions 641 support the developing unit 7 in the photosensitive unit 6.

As illustrated in FIG. 10, projection portions 643 that protrude in the up direction are provided in both end portions in the left-right direction of a bottom surface 613 of the frame 610. The projection portions 643 abut bosses 718 provided in a bottom portion of the housing 700 of the developing unit 7 illustrated in FIG. 11, thereby supporting the developing unit 7.

In the configuration of the present exemplary embodiment, as illustrated in FIG. 7, a holding member 650 is provided that prevents the developing unit 7 from being detached from the photosensitive unit 6 in the state where the developing unit 7 is attached to the photosensitive unit 6.

As illustrated in FIG. 9, the pressing members 640 are provided in both end portions in the left-right direction of the frame 610 at its front and biased in a direction from front to back by compression springs 640A (FIG. 10) as biasing members. Thus, by the biasing forces of the compression springs 640A (FIG. 10), the pressing members 640 press the bosses 718 (FIG. 11) provided in the housing 700 of the developing unit 7. The pressing members 640 press the developing unit 7, thereby biasing the developing roller 71 toward the photosensitive drum 61.

As illustrated in FIG. 8, a photosensitive member gear (first gear) 65 and a transfer gear (second gear) 66 are fixed to a left end portion of the photosensitive drum 61 and configured to rotate integrally with the photosensitive drum 61. If the process cartridge 5 is attached to the apparatus main body 2, a driving gear (not illustrated) of the apparatus main body 2 and the photosensitive member gear 65 mesh with each other, thereby transmitting a driving force to the photosensitive drum 61 and the transfer gear 66 so that the photosensitive drum 61 and the transfer gear 66 can rotate. Further, the transfer gear 66 meshes with a transfer roller gear (third gear) 67 (FIG. 1) fixed to a left end portion of the transfer roller 63 so that the transfer roller 63 can also rotate.

<Toner Container>

Figure 12:
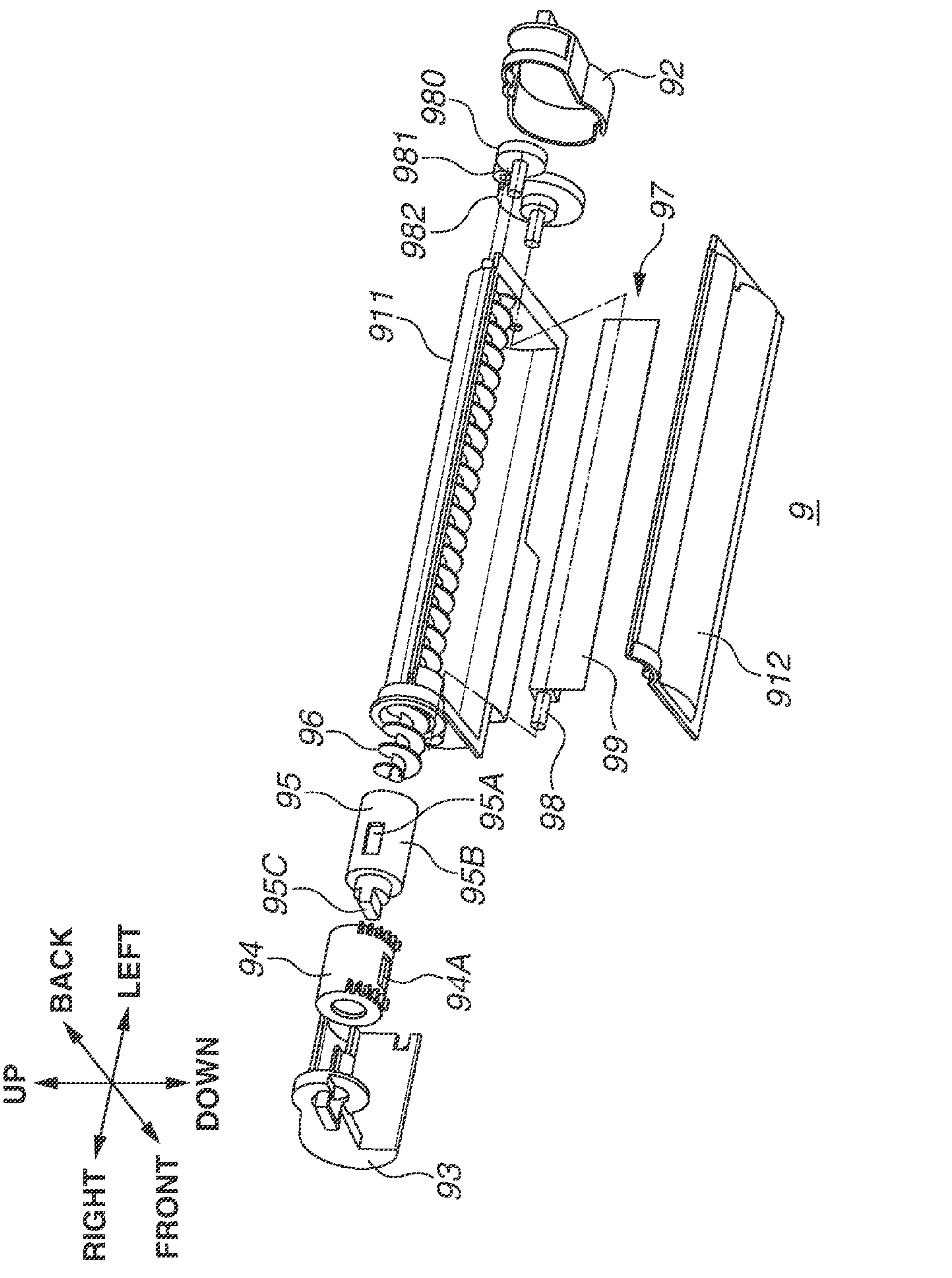
FIG. 12 is an exploded perspective view of a toner container according to the first exemplary embodiment.
Figure 13:
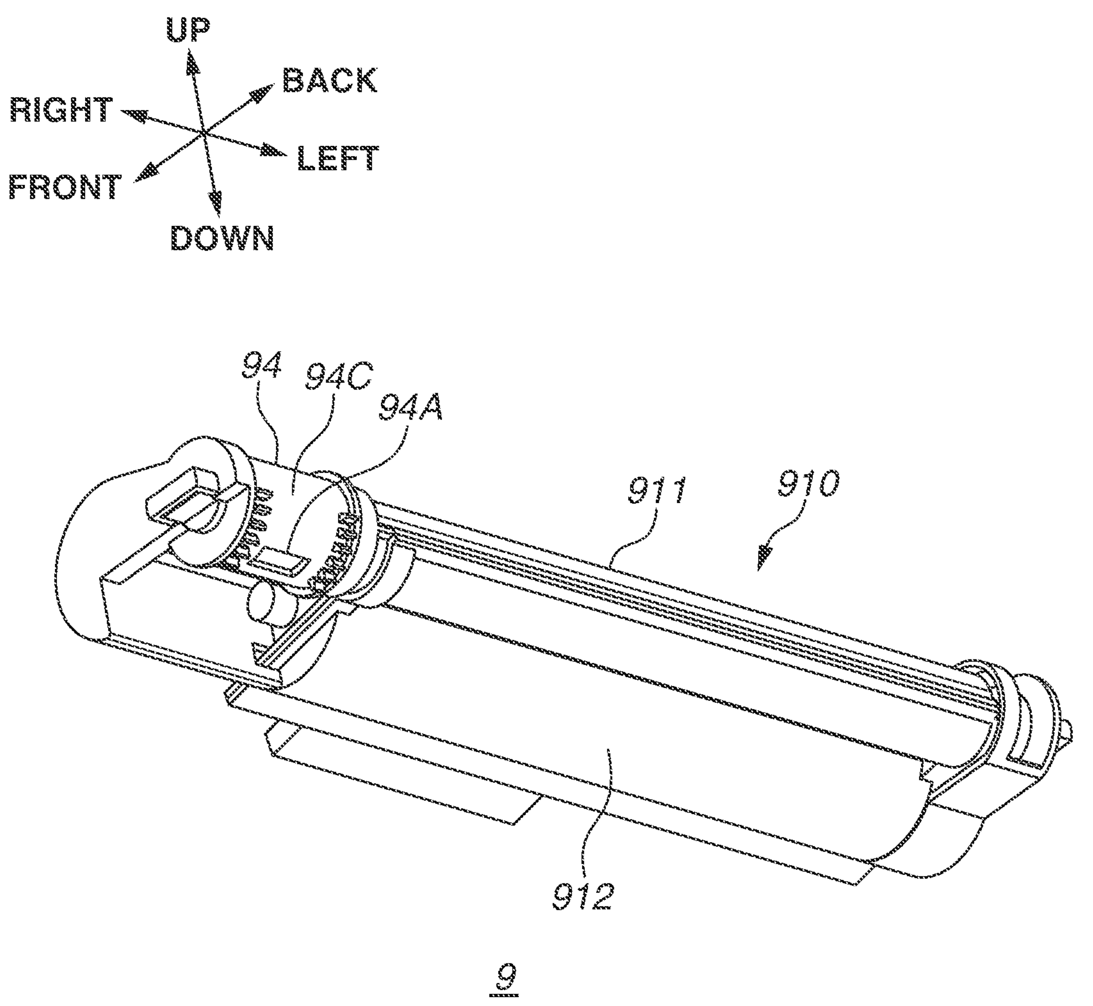
FIG. 13 is a bottom perspective view of the toner container according to the first exemplary embodiment.
Figure 14:
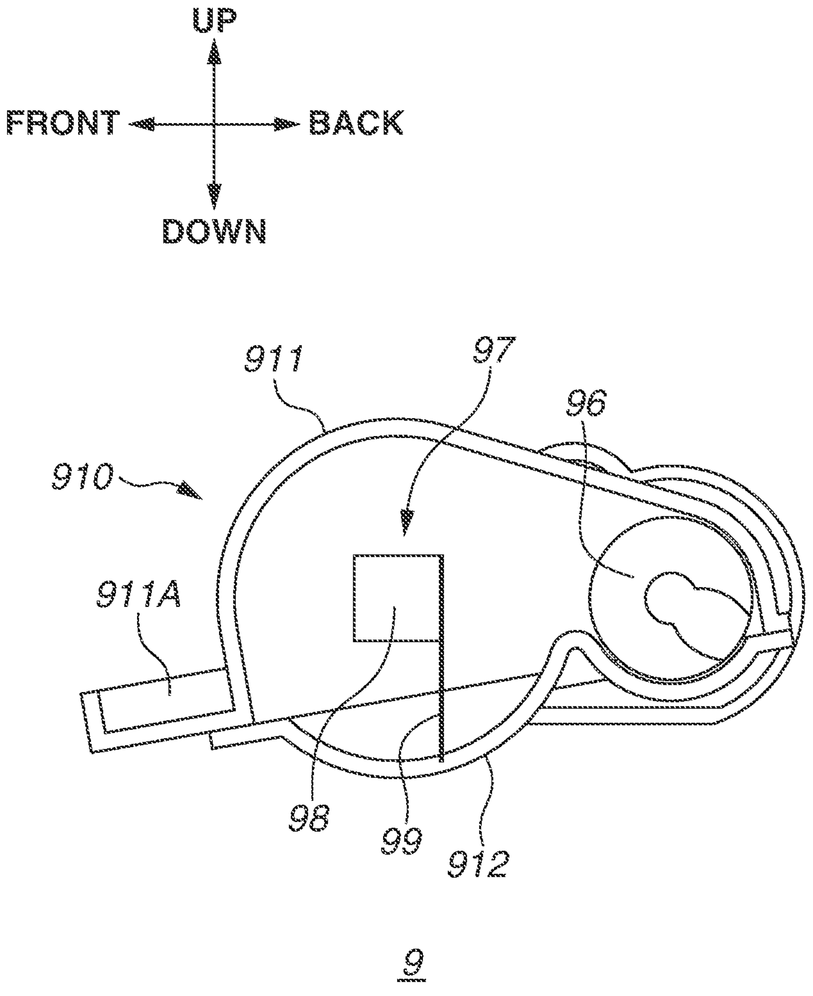
FIG. 14 is a cross-sectional view of the toner container according to the first exemplary embodiment.

Next, the configuration of the toner container 9 is described. FIG. 12 is an exploded perspective view of the toner container 9. FIG. 13 is a bottom perspective view of the toner container 9. FIG. 14 is a cross-sectional view of the toner container 9.

As illustrated in FIG. 12, the toner container 9 mainly includes a container member 911, a bottom member 912, a T-side holder L 92, a T-side holder R 93, a discharge port forming member 94, a discharge side shutter 95, a conveying screw 96, and a second agitator 97. To transmit drive, the toner container 9 includes a conveying screw gear 980, a T-idle gear 981, and a second agitator gear 982.

As illustrated in FIG. 13, a toner container 910 is formed of the container member 911 and the bottom member 912 and stores toner inside. To one end portion in the longitudinal direction of the toner container 910, the discharge port forming member 94 is fixed. The discharge port forming member 94 includes a discharge port forming surface 94C in its outer peripheral portion. In the discharge port forming surface 94C, a discharge port 94A (a toner discharge port) is formed that discharges toner to outside.

As illustrated in FIG. 14, the conveying screw 96 and the second agitator 97 are rotatably provided inside the toner container 910. The conveying screw gear 980 and the second agitator gear 982 that are provided outside the toner container 910 transmit driving forces to the conveying screw 96 and the second agitator 97, respectively, whereby the conveying screw 96 and the second agitator 97 rotate (see FIG. 12). Similarly to the first agitator 75A, the second agitator 97 includes a second agitation bar 98 and a second agitation sheet 99. Toner stored inside the toner container 910 is agitated and conveyed to the conveying screw 96 by the second agitator 97, next conveyed to the discharge port 94A, illustrated in FIG. 13, by the conveying screw 96, and discharged from the discharge port 94A.

As illustrated in FIG. 12, the discharge side shutter 95 (a second shutter) configured to open and close the discharge port 94A is rotatably provided inside the discharge port forming member 94. In the discharge side shutter 95, a toner passage hole 95A and a closing portion 95B are provided. In a case where the toner passage hole 95A and the discharge port 94A coincide with each other, toner can be discharged. On the other hand, in a case where the closing portion 95B is opposed to the discharge port 94A, toner is prohibited from being discharged, thereby preventing toner inside the toner container 9 from leaking when the toner container 9 is carried.

<Support Configuration of Toner Container>

Figure 15A:
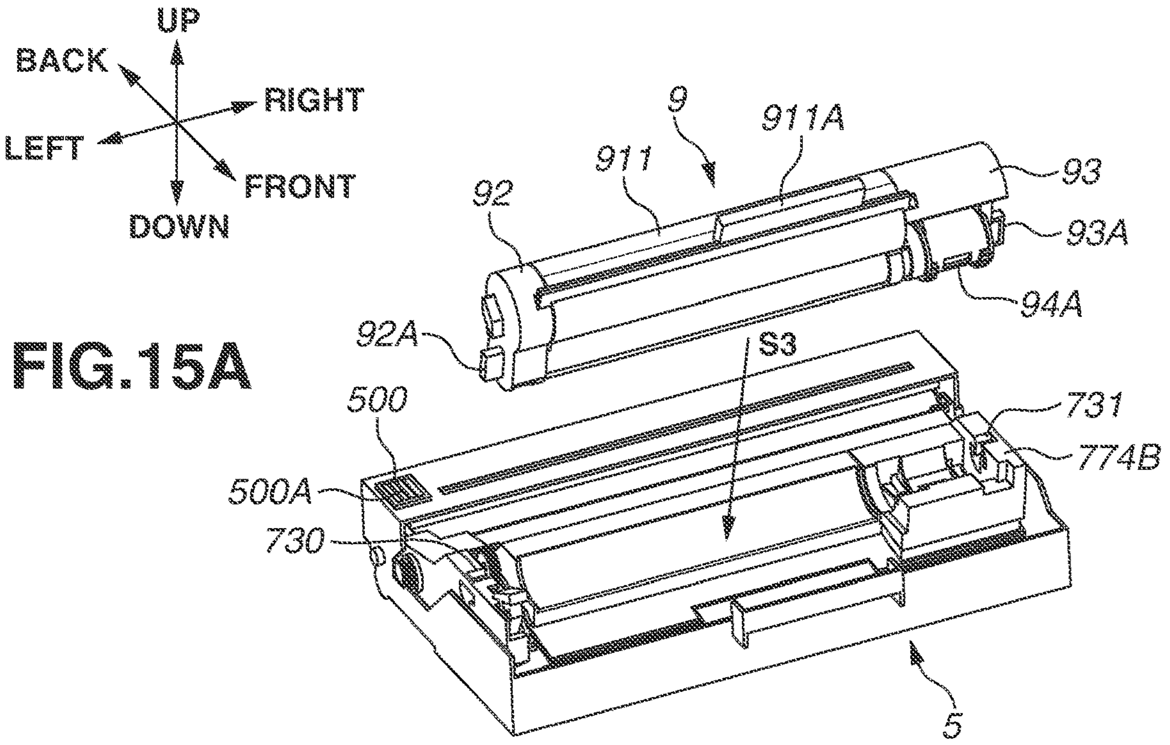
FIGS. 15A, 15B, and 15C are perspective views of the toner container and the process cartridge according to the first exemplary embodiment.
Figure 15B:
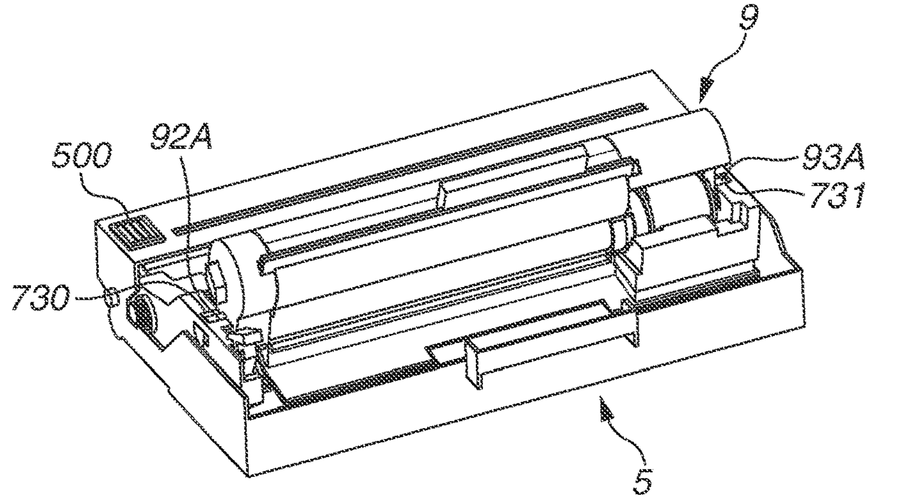
Figure 15C:
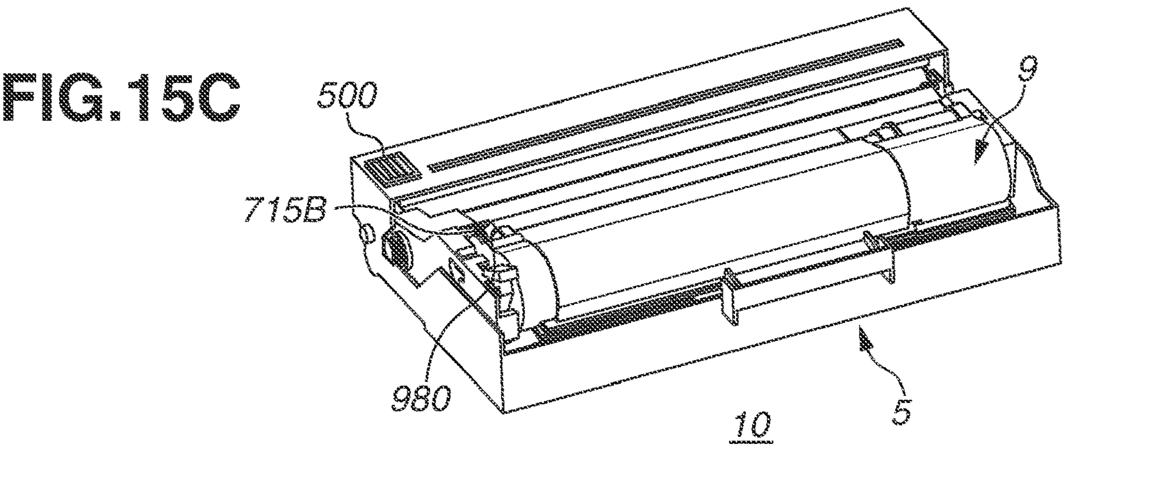

Next, the support configuration of the toner container 9 is described. FIGS. 15A, 15B, and 15C are perspective views of the toner container 9 and the process cartridge 5. FIG. 15A illustrates the state before the toner container 9 is attached. FIG. 15B illustrates the state of the process of attaching the toner container 9. FIG. 15C illustrates the state of the completion of the attachment of the toner container 9. As illustrated in FIGS. 15A, 15B, and 15C, the toner container 9 is configured to be attachable to and detachable from the developing unit 7. First, in the container member 911 of the toner container 9, a handle portion 911A as a second unit grip portion is provided. To both end portions in the longitudinal direction of the toner container 9, the T-side holder L 92 and the T-side holder R 93 are fixed. The T-side holders 92 and 93 include a supporting target projection 92A (a first supporting target portion) and supporting target projections 93A (second supporting target portions), respectively, that are supported by the developing unit 7. In the developing unit 7, a supporting portion 730 (a first supporting portion) and a supporting portion 731 (a second supporting portion) are provided that support the supporting target projections 92A and 93A, respectively.

To attach the toner container 9 to the developing unit 7, then as illustrated in FIG. 15A, the user moves the toner container 9 in the direction of an arrow S3 from above the developing unit 7 while gripping the handle portion 911A. As illustrated in FIG. 15B, the toner container 9 moved in the direction of the arrow S3 is in the state where the supporting target projections 92A and 93A are temporarily supported by the supporting portions 730 and 731, respectively. The orientation of the cartridge 10 in this state is defined as a first orientation. In the state where the toner container 9 is in the first orientation, the toner container 9 is rotated about the centers of the supporting target projections 92A and 93A, whereby the attachment of the toner container 9 is completed as illustrated in FIG. 15C. The orientation of the toner container 9 when the attachment of the toner container 9 to the developing unit 7 is completed is defined as a second orientation. In the attachment completion state, the conveying screw gear 980 of the toner container 9 can mesh with the idle gear 715B of the developing unit 7. This transmits the driving force of the developing unit 7 to the toner container 9. The life of the toner container 9, determined based on the amount of toner stored in the toner container 9, is set to be shorter than the life of the process cartridge 5 determined based on the life of the photosensitive drum 61 and the life of the developing roller 71. Thus, only the toner container 9 reaching the end of its life needs to be replaced separately from the process cartridge 5. In this case, the toner container 9 can be replaced by only opening the door 21 (FIG. 1). The user can perform the work of replacing the toner container 9 without taking the process cartridge 5 out of the apparatus main body 2.

<Reception Side Shutter>

Next, the operation of opening and closing a reception side shutter 773 (a first shutter) is described. FIGS. 16A and 16B are diagrams illustrating the operation of opening and closing the reception side shutter 773 of the developing unit 7. FIG. 16A illustrates the state where the reception side shutter 773 is closed. FIG. 16B illustrates the state where the reception side shutter 773 is open.

First, as illustrated in FIG. 4, the toner reception unit 770 of the developing unit 7 includes a toner reception port 771, a reception side shutter seal 772, the reception side shutter 773, a reception port cover 774, and a connection seal 775 that are provided on the upper surface of the housing 700. In these components, hole portions 772A, 773A, 774A, and 775A are provided. The hole portions 772A, 774A, and 775A of the reception side shutter seal 772, the reception port cover 774, and the connection seal 775, respectively, are assembled in the state where the hole portions 772A, 774A, and 775A coincide with the toner reception port 771. The reception side shutter 773 includes a blocking portion 773B in addition to the hole portion 773A. The reception side shutter 773 is assembled in the state where the reception side shutter 773 can move in a sliding manner. The toner reception port 771 is opened and closed by this sliding movement.

As illustrated in FIGS. 16A and 16B, the operation of opening and closing the reception side shutter 773 is performed in conjunction with the operation of attaching and detaching the toner container 9. On the outer peripheral surface of the discharge port forming member 94 of the toner container 9, a driving projection group 94B is placed. In the reception side shutter 773, a driving target projection group 773C is placed.

As described above, the toner container 9 rotationally moves in the process of attaching the toner container 9 to the developing unit 7, thereby shifting to the attachment completion state. FIG. 16A illustrates the state before the toner container 9 rotationally moves in the attachment process. In this state, the blocking portion 773B of the reception side shutter 773 is opposed to the toner reception port 771, and the toner reception port 771 is closed. At this time, the driving projection group 94B and the driving target projection group 773C are engaged with each other.

Next, FIG. 16B illustrates the state where the toner container 9 is rotated and is in the attachment completion state. At this time, the toner container 9 is rotationally moved in the state where the driving projection group 94B and the driving target projection group 773C maintain the engagement, and therefore, the reception side shutter 773 moves in a sliding manner in conjunction with the rotational movement of the toner container 9. Consequently, the positions of the hole portion 773A of the reception side shutter 773 and the toner reception port 771 coincide with each other, and the toner reception port 771 is opened.

Also when the toner container 9 is detached from the developing unit 7, similarly, the reception side shutter 773 moves in a sliding manner in conjunction with the rotational movement of the toner container 9, and the toner reception port 771 is closed.

As described above, in the state where the toner container 9 is attached to the developing unit 7, the toner reception port 771 is opened, thereby enabling toner to be received inside the developing unit 7. On the other hand, in the state where the toner container 9 is not attached to the developing unit 7, the toner reception port 771 is closed, thereby preventing foreign substances from being mixed into toner inside the developing unit 7, and also preventing toner from leaking to outside.

<Discharge Side Shutter>

Figure 17A:
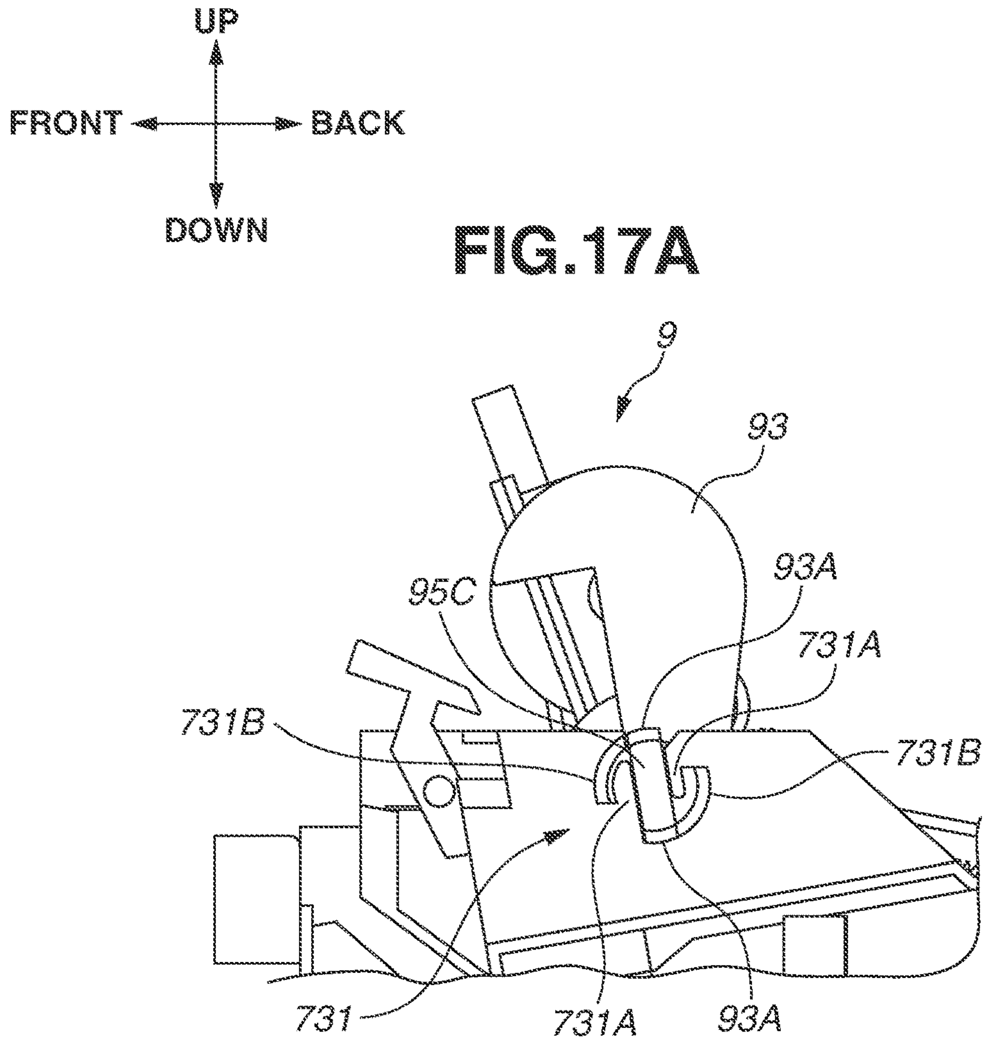
FIGS. 17A and 17B are diagrams illustrating an operation of opening and closing a discharge side shutter of the toner container according to the first exemplary embodiment.
Figure 17B:
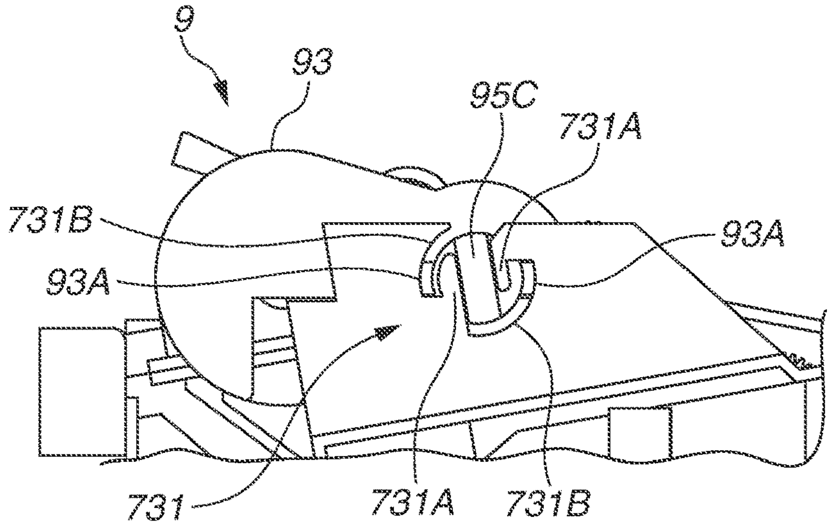

Next, the operation of opening and closing the discharge side shutter 95 is described. FIGS. 17A and 17B are diagrams illustrating the operation of opening and closing the discharge side shutter 95 of the toner container 9. FIG. 17A illustrates the state where the discharge side shutter 95 is closed. FIG. 17B illustrates the state where the discharge side shutter 95 is open.

As described above, in a case where the positions of the discharge port 94A of the discharge port forming member 94 and the toner passage hole 95A of the discharge side shutter 95 illustrated in FIG. 12 coincide with each other, the discharge port 94A is open. In a case where the closing portion 95B of the discharge side shutter 95 is opposed to the discharge port 94A, the discharge port 94A is closed. Similarly to the operation of opening and closing the reception side shutter 773, the operation of opening and closing the discharge side shutter 95 is also performed in conjunction with the rotational movement of the toner container 9 when the toner container 9 is attached and detached.

As illustrated in FIGS. 17A and 17B, in the discharge side shutter 95, a locking target projection 95C is provided. The locking target projection 95C is placed radially inside the supporting target projections R 93A. In the supporting portion R 731 of the developing unit 7, locking portions 731A and notch portions 731B are provided.

FIG. 17A illustrates the state before the toner container 9 rotationally moves in the attachment process. In this state, the closing portion 95B (FIG. 12) of the discharge side shutter 95 and the discharge port 94A (FIG. 12) are opposed to each other. Thus, the discharge port 94A (FIG. 12) is closed. At this time, the locking target projection 95C is sandwiched by the locking portions 731A, and the discharge side shutter 95 is prohibited from rotationally moving relative to the developing unit 7.

Next, FIG. 17B illustrates the state where the toner container 9 is rotated and is in the attachment completion state. At this time, the toner container 9 is rotated relative to the developing unit 7 in the state where the discharge side shutter 95 is prohibited from rotationally moving. The supporting target projections R 93A can enter the notch portions 731B. Thus, the rotations of components other than the discharge side shutter 95 are not hindered in the toner container 9.

Based on the above, by the rotational movement of the toner container 9 in the process of attaching the toner container 9, the discharge port forming member 94 rotates in relation to the discharge side shutter 95, resulting in the discharge side shutter 95 relatively rotating inside the toner container 9. Consequently, the positions of the toner passage hole 95A (FIG. 12) of the discharge side shutter 95 and the discharge port 94A (FIG. 12) coincide with each other, and the discharge port 94A (FIG. 12) is opened.

Also when the toner container 9 is detached from the developing unit 7, similarly, the discharge port forming member 94 rotates in relation to the discharge side shutter 95, resulting in the discharge side shutter 95 relatively rotating in conjunction with the rotational movement of the toner container 9, and the discharge port 94A (FIG. 12) is closed.

<Lift Mechanism of Toner Container>

Next, the lift mechanism 760 of the toner container 9 is described. FIGS. 18A, 18B, and 18C illustrate the motion of the lift mechanism 760 in the process of attaching the toner container 9. FIG. 18A illustrates the state where the toner container 9 is on the lift mechanism 760 in the attachment process. FIG. 18B illustrates the state where the toner container 9 opens the lift mechanism 760 in the attachment process. FIG. 18C illustrates the state where the attachment of the toner container 9 is completed.

FIGS. 19A, 19B, and 19C illustrate the motion of shifting the toner container 9 in the attached state to a lifted-up state by the lift mechanism 760. FIG. 19A illustrates the state where the attachment of the toner container 9 is completed. FIG. 19B illustrates the state where the toner container 9 is lifted up by the lift mechanism 760. FIG. 19C illustrates the state where the toner container 9 is in the lifted-up state. FIGS. 19A, 19B, and 19C omit the side holder 719 of the developing unit 7 for illustrative purposes.

As illustrated in FIGS. 19A, 19B, and 19C, in the T-side holder L 92 of the toner container 9, a protruding portion 92B is provided. The protruding portion 92B includes an abutment surface 92C, a retention surface 92D, and a reception surface 92E. As illustrated in FIG. 5, the lift mechanism 760 includes a boss 719A, a lift member 761, and a helical coil spring 762 that are provided in the side holder 719 of the developing unit 7. The lift member 761 and the helical coil spring 762 are attached to the boss 719A, and the lift member 761 is rotatable about the boss 719A. The lift member 761 includes an abutment portion 761A, an operation unit 761B, and a raising portion 761C. The lift member 761 is biased in the direction of an arrow R1 by the helical coil spring 762.

First, with reference to FIGS. 18A, 18B, and 18C, the motion of the lift mechanism 760 in the process of attaching the toner container 9 is described.

If the toner container 9 rotationally moves in the attachment process, then as illustrated in FIG. 18A, the abutment surface 92C and the abutment portion 761A abut each other, and the toner container 9 is on the lift mechanism 760. Next, if the toner container 9 continues rotationally moving, then as illustrated in FIG. 18B, the lift member 761 is pressed by the abutment surface 92C, thereby rotating in the direction of an arrow R2. Then, the lift member 761 allows the rotational movement of the toner container 9. Then, if the toner container 9 further continues rotationally moving, and the attachment of the toner container 9 is completed, then as illustrated in FIG. 18C, the abutment portion 761A comes off the abutment surface 92C and comes into contact with the retention surface 92D. This enables the lift member 761 to retain the toner container 9 in the attachment completion state.

Next, with reference to FIGS. 19A, 19B, and 19C, the motion of shifting the toner container 9 from the attachment completion state to the lifted-up state is described. As illustrated in FIG. 19A, in the attachment completion state of the toner container 9, the abutment portion 761A of the lift member 761 abuts the retention surface 92D, and the toner container 9 cannot be detached. To detach the toner container 9, then as illustrated in FIG. 19B, the lift member 761 is rotated in the direction of the arrow R2 by operating the operation unit 761B of the lift member 761. Consequently, the raising portion 761C of the lift member 761 abuts the reception surface 92E, and the toner container 9 can be rotated. If the operation unit 761B is released after that, then as illustrated in FIG. 19C, the lift member 761 rotates in the direction of the arrow R1 by the biasing force of the helical coil spring 762. The abutment surface 92C and the abutment portion 761B abut each other, and the toner container 9 enters the lifted-up state where the toner container 9 is on the lift mechanism 760. Consequently, the toner container 9 can be detached.

<Placement of Memory Tag>

Next, the placement of a memory tag 500 (a memory) as a storage member according to the first exemplary embodiment is described.

As illustrated in FIGS. 15A, 15B, and 15C, the process cartridge 5 includes the memory tag 500. The memory tag 500 includes an information transmission contact 500A. The memory tag 500 can store and transmit various pieces of information. A tag contact (not illustrated) of the apparatus main body 2 and the information transmission contact 500A come into electrical contact with each other, thereby transmitting information.

If the information transmission contact 500A of the memory tag 500 becomes soiled, an electrical contact failure occurs between the information transmission contact 500A and the tag contact (not illustrated) of the apparatus main body 2, and an information transmission failure is likely to occur. Thus, it is desirable to place the memory tag 500 at a position where the memory tag 500 is as less likely to be soiled as possible. The periphery of the toner reception port 771 (FIG. 5) of the developing unit 7 and the discharge port 94A of the toner container 9 is a place where toner is likely to be scattered during the operation of attaching and detaching the toner container 9 to and from the process cartridge 5.

In FIG. 7, in the axis direction of the photosensitive drum 61, the toner storage portion 74 includes an end portion R (a first end portion) on the right side and an end portion L (a second end portion) on the left side, which is an end portion on the opposite side of the end portion R. The toner reception port 771 (FIG. 7) and the discharge port 94A are provided in the end portion R of the toner storage portion 74. On the other hand, in the axis direction of the photosensitive drum 61, the memory tag 500 is provided in an end portion of the process cartridge 5 on the same side as the end portion L of the toner storage portion 74.

That is, in the axis direction of the photosensitive drum 61, the memory tag 500 is placed at a position away from the toner reception port 771 (FIG. 7) and the discharge port 94A. This is to prevent toner scattered by the operation of attaching and detaching the toner container 9 to and from the developing unit 7 from being attached to the memory tag 500.

The specific placement of the memory tag 500 in the process cartridge 5 is described.

In the present exemplary embodiment, as illustrated in FIGS. 7 and 8, a configuration is employed in which the memory tag 500 is retained on the upper surface of the frame 610. As illustrated in FIG. 5, in the front-back direction, the toner reception port 771 is provided at a position closer to the grip portion 617 than the photosensitive drum 61, and the memory tag 500 is provided at a position closer to the photosensitive drum 61 than the grip portion 617. A configuration is employed in which the memory tag 500 is placed at a position away from the toner reception port 771 also in the front-back direction, whereby scattered toner is less likely to be attached to the memory tag 500. Further, the memory tag 500 is placed at a position away from the grip portion 617 in the front-back direction, whereby the user is less likely to touch the memory tag 500. As illustrated in FIGS. 5 and 9, in the up-down direction (a second direction), the memory tag 500 is provided at a position overlapping the photosensitive drum 61 and the charging member 68. The memory tag 500 is provided such that the charging member 68 is between the photosensitive drum 61 and the memory tag 500. As illustrated in FIG. 5, in the up-down direction, the memory tag 500 is provided at a position away from the toner reception port 771 in a direction from the transfer roller 63 to the photosensitive drum 61 (a direction from the lower side to the upper side). In the up-down direction, the memory tag 500 is provided on the opposite side of the transfer roller 63 across the photosensitive drum 61.

By thus devising the placement of the memory tag 500, it is possible to prevent toner scattered by the operation of attaching and detaching the toner container 9 to and from the developing unit 7 from being attached to the memory tag 500.

<Variations>

Figure 25A:
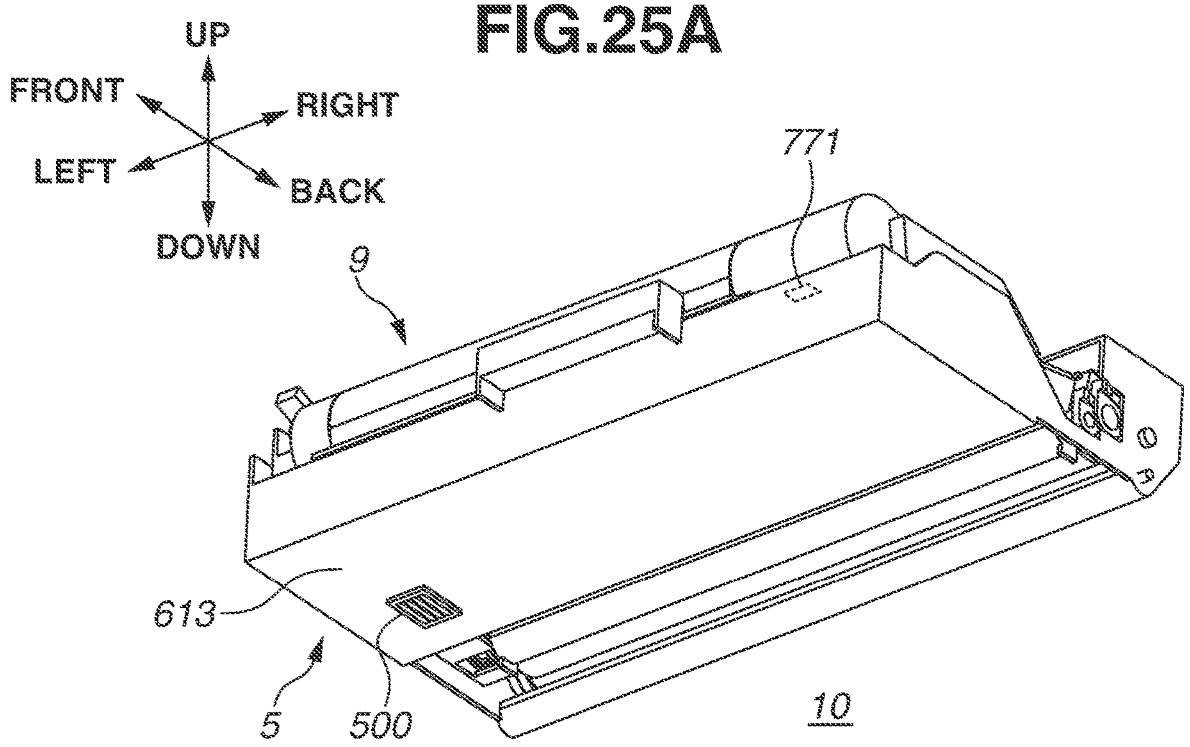
FIGS. 25A and 25B are perspective views of process cartridges according to variations of the first exemplary embodiment.
Figure 25B:
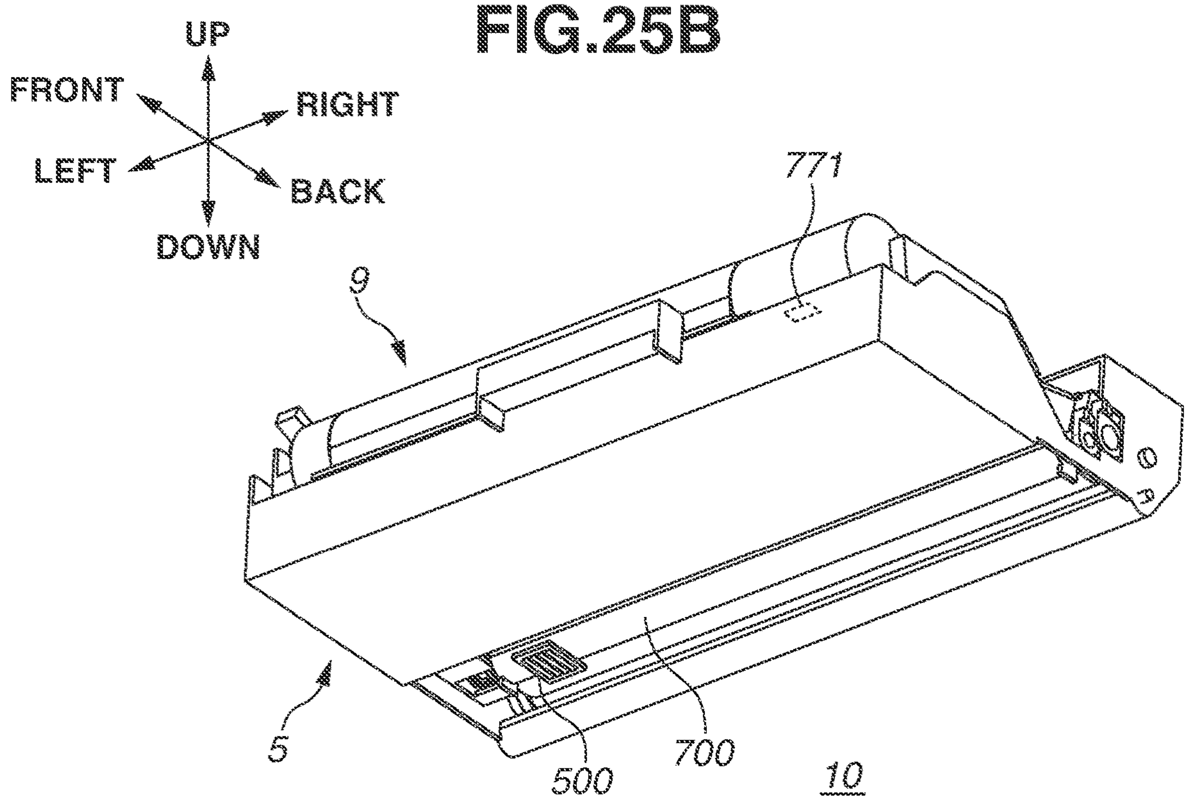

The position of the memory tag 500 is not limited to that in the present exemplary embodiment so long as in the left-right direction (the axis direction of the photosensitive drum 61), the memory tag 500 is provided in an end portion of the process cartridge 5 on the same side as the end portion L of the toner storage portion 74. FIGS. 25A and 25B illustrate the configurations of first and second variations of the present exemplary embodiment. FIG. 25A illustrates a configuration in which the memory tag 500 is provided on a surface of the frame 610 on the opposite side of a surface (the bottom surface 613) of the frame 610 on the side where the developing unit 7 is attached. In FIG. 25B, the frame 610 includes an opening portion in its surface opposed to the housing 700 of the developing unit 7, and the memory 500 is provided in an area of the housing 700 that is exposed through the opening portion. A surface on the opposite side of the side where the toner reception port 771 is provided is less likely to be influenced by scattered toner.

Figure 26:
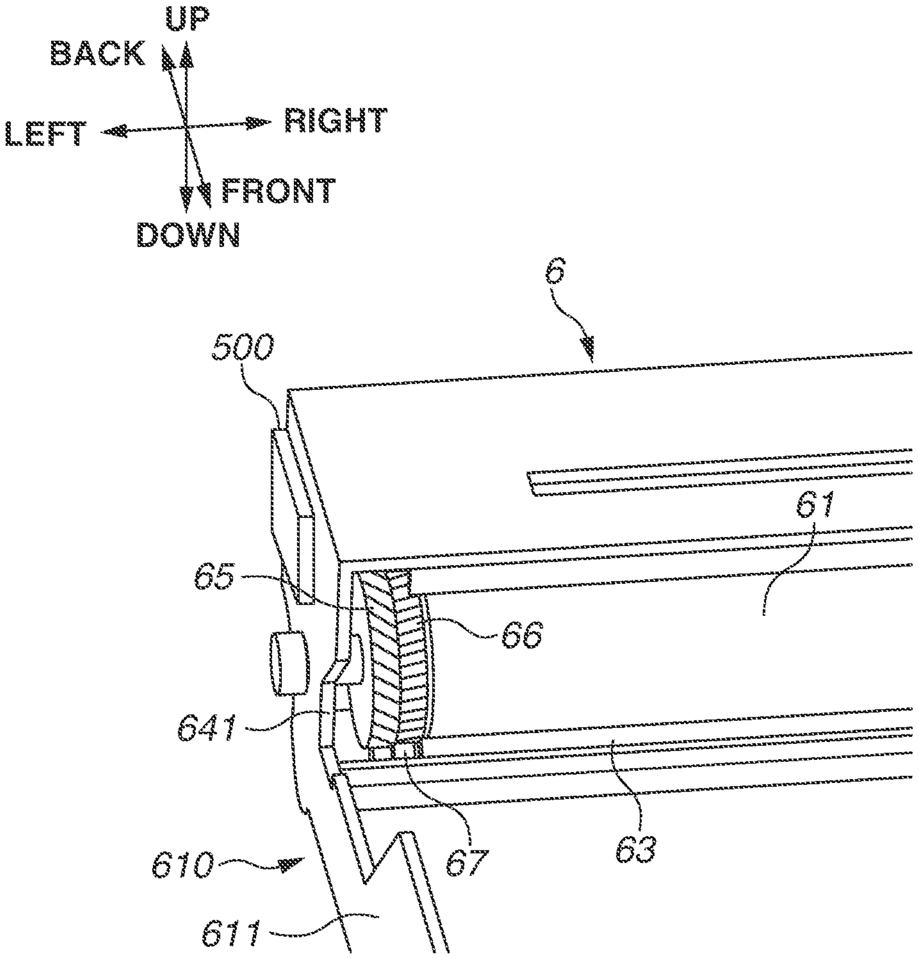
FIG. 26 is a partial perspective view of a photosensitive unit according to a variation of the first exemplary embodiment.

FIG. 26 illustrates the configuration of a third variation of the present exemplary embodiment. The memory tag 500 is provided on a side surface of the frame 610 on the same side as the end portion L of the toner storage portion 74. The configuration of the third variation can secure the longest distance from the toner reception port 771 in the axis direction of the photosensitive drum 61.

The "up-down direction" as used herein refers to a direction intersecting both the front-back direction (a first direction) and the left-right direction (the axis direction of the photosensitive drum 61).

The first, second, and third variations also achieve the effect of preventing toner scattered by the operation of attaching and detaching the toner container 9 to and from the developing unit 7 from being attached to the memory tag 500.

Next, a second exemplary embodiment is described. Only the differences from the first exemplary embodiment are described here. Other portions are similar to those in the first exemplary embodiment, and therefore are not described here.

<Placement of Memory Tag>

Figure 20:
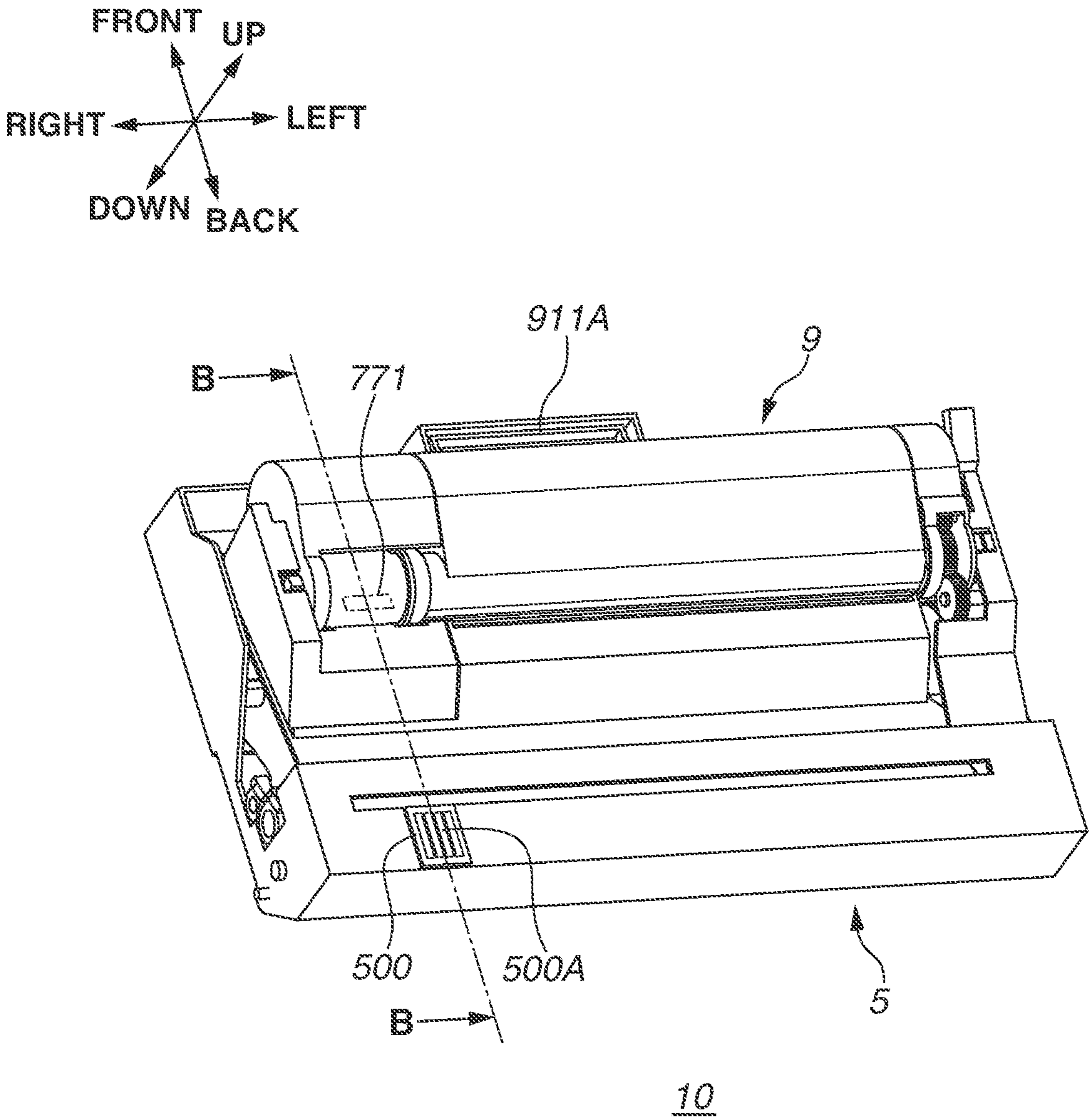
FIG. 20 is a perspective view of a cartridge according to a second exemplary embodiment.
Figure 21:
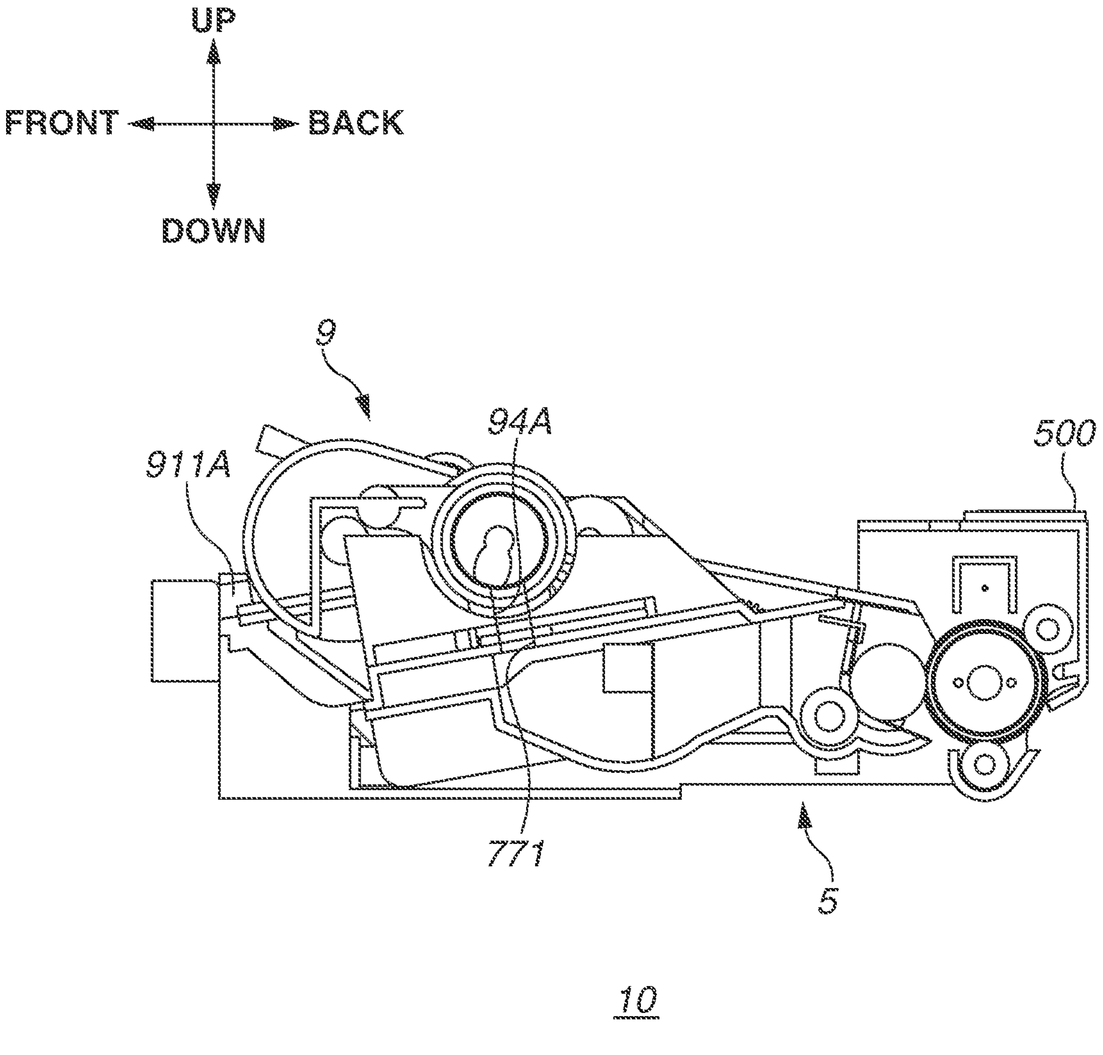
FIG. 21 is a cross-sectional view of the cartridge according to the second exemplary embodiment.

The placement of the memory tag 500 according to the second exemplary embodiment is described. FIG. 20 is a perspective view of the cartridge 10 according to the second exemplary embodiment. FIG. 21 is a cross-sectional view of the cartridge 10 along a B-B cross section in FIG. 20.

As described above with reference to FIGS. 15A, 15B, and 15C, the user performs the work of replacing the toner container 9 while gripping the handle portion 911A. At this time, the user performs the work from the front side in the front-back direction. Thus, in view of the visibility and the operability of the handle portion 911A, generally, the handle portion 911A is placed on the front side of the toner container 9. Then, it is considered that when the work of replacing the toner container 9 as described above is performed, an area through which the toner container 9 passes is further on the front side than the attachment completion position of the toner container 9. Thus, the scattering of toner by the work of replacing the toner container 9 concentrates further on the front side than the toner reception port 771 (FIG. 5) and the discharge port 94A in the front-back direction.

As illustrated in FIG. 20, in the left-right direction, similarly to the toner reception port 771 and the discharge port 94A (not illustrated), the memory tag 500 is provided in an end portion on one end side in the axis direction of the developing roller 71 (FIG. 4). As illustrated in FIG. 21, however, in the front-back direction, the memory tag 500 is placed on the opposite side of the handle portion 911A of the toner container 9 with the toner reception port 771 as a boundary.

This results in a configuration in which in the axis direction of the developing roller 71 (FIG. 4), the memory tag 500, the toner reception port 771, and the discharge port 94A are placed close to one another, but toner scattered when the work of replacing the toner container 9 is performed is less likely to be attached to the memory tag 500.

Next, a third exemplary embodiment is described. Only the differences from the first exemplary embodiment are described also here. Other portions are similar to those in the first exemplary embodiment, and therefore are not described here.

<Placement of Memory Tag>

Figure 22:
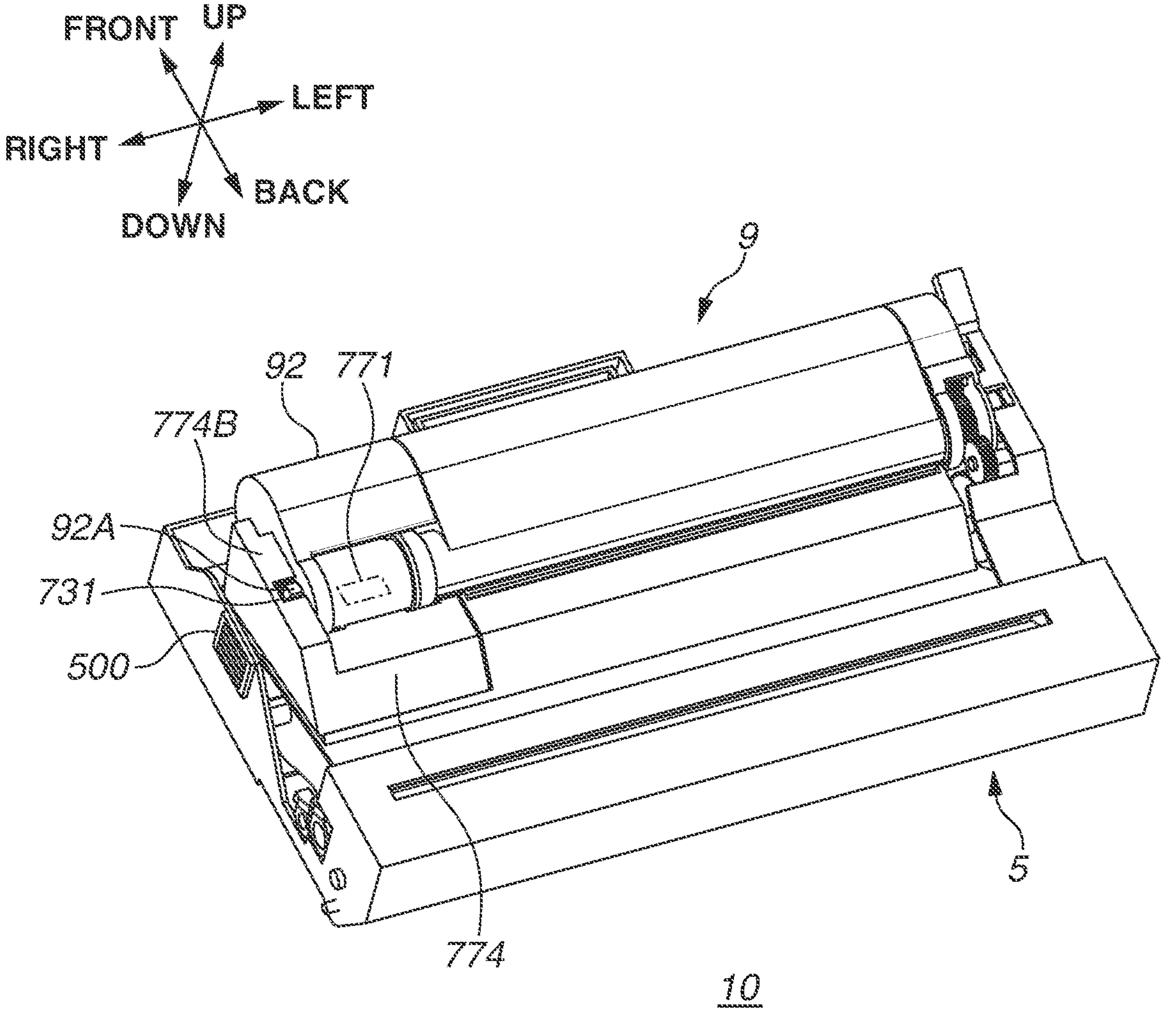
FIG. 22 is a perspective view of a cartridge according to a third exemplary embodiment.

The placement of the memory tag 500 according to the third exemplary embodiment is described. FIG. 22 is a perspective view of the cartridge 10 according to the third exemplary embodiment.

As illustrated in FIG. 22, a wall portion 774B is provided outside the toner reception port 771 in the axis direction of the developing roller 71 (FIG. 4). The memory tag 500 is provided further outside the wall portion 774B in the axis direction of the developing roller 71 (FIG. 4). That is, the wall portion 774B is placed between the toner reception port 771 and the memory tag 500.

This enables the wall portion 774B to block the attachment of toner scattered by the work of replacing the toner container 9 to the memory tag 500.

Next, a fourth exemplary embodiment is described. Only the differences from the first exemplary embodiment are described also here. Other portions are similar to those in the first exemplary embodiment, and therefore are not described here.

<Placement of Memory Tag>

Figure 23:
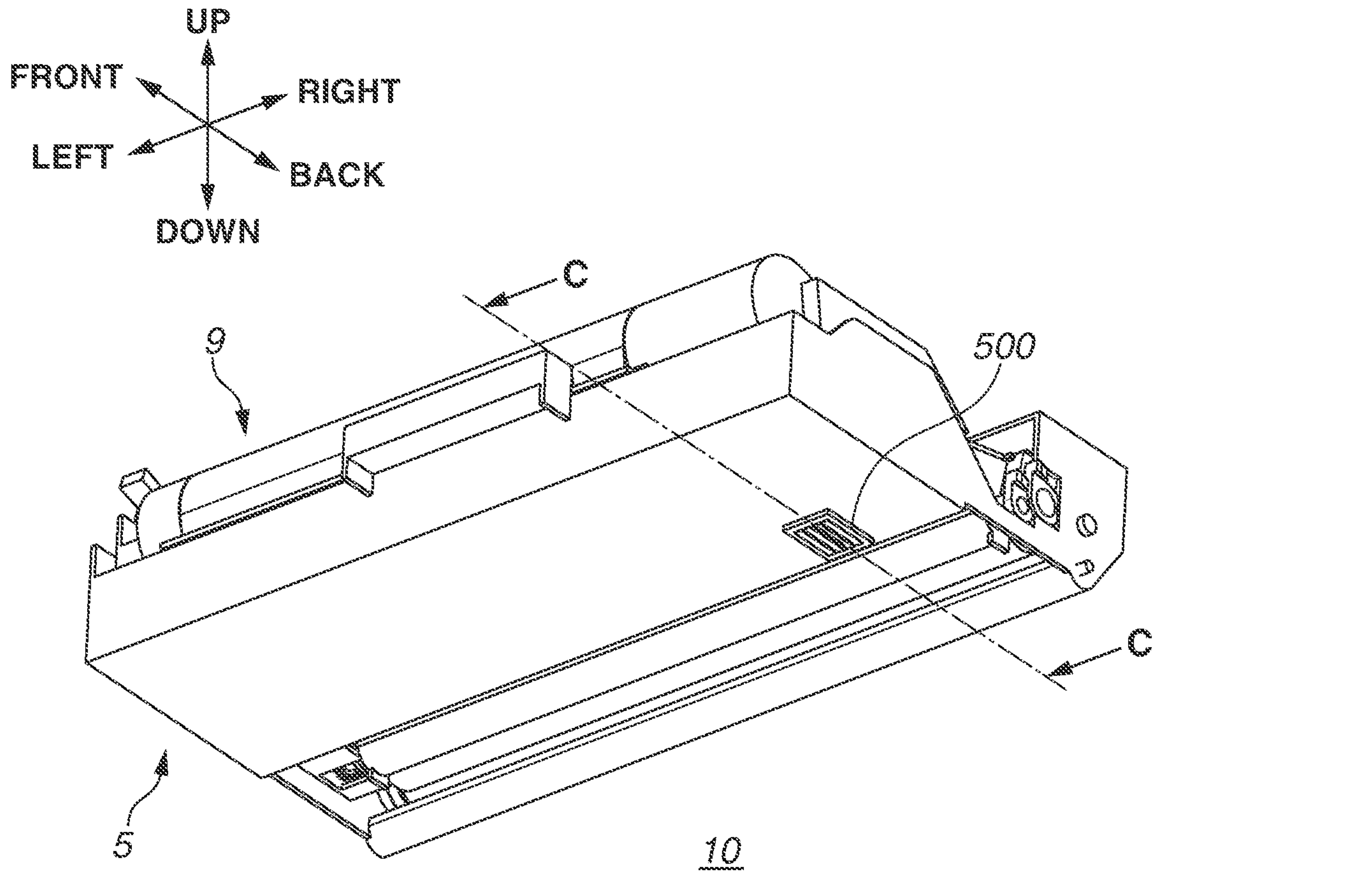
FIG. 23 is a perspective view of a cartridge according to a fourth exemplary embodiment.
Figure 24:
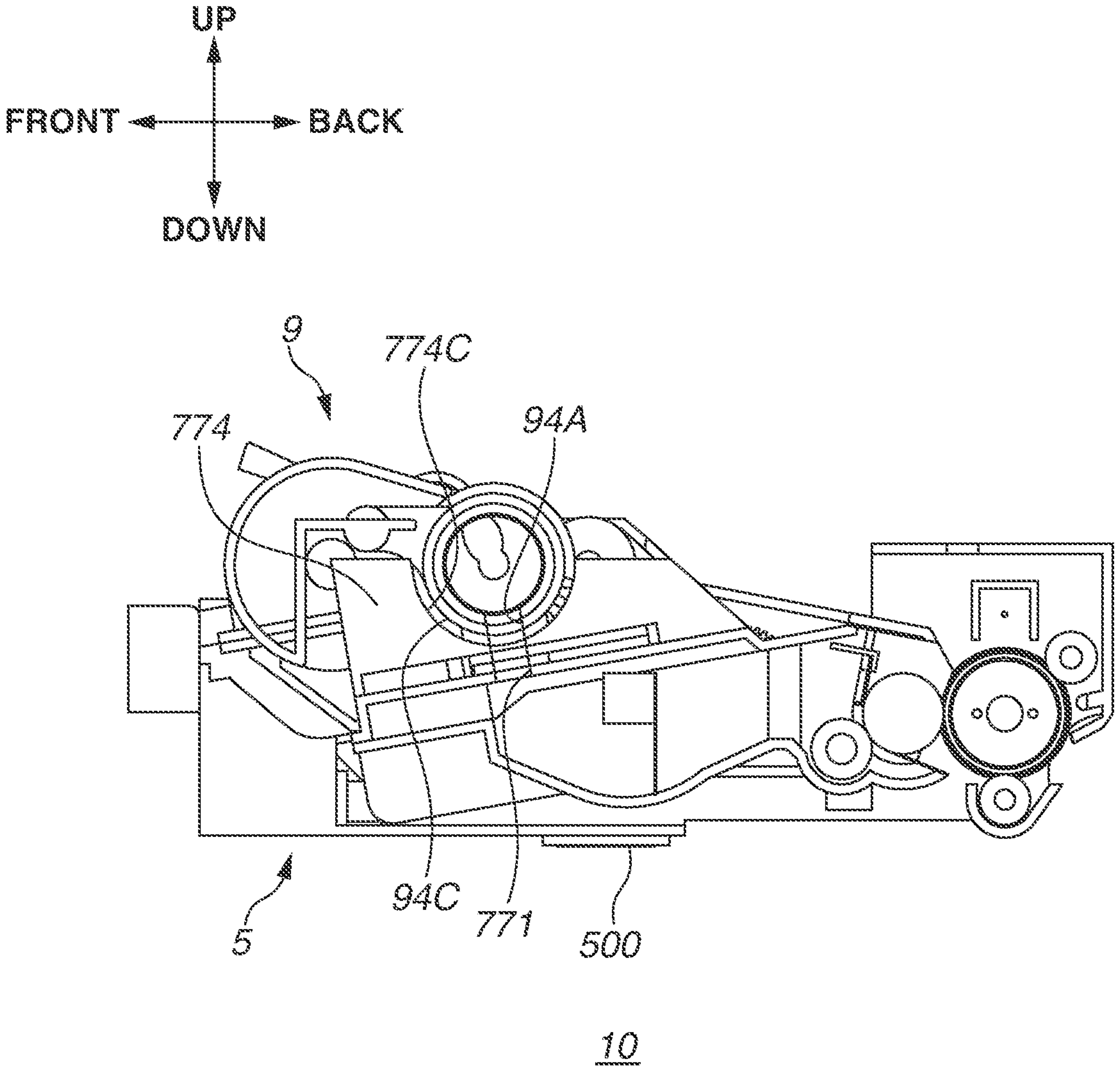
FIG. 24 is a cross-sectional view of the cartridge according to the fourth exemplary embodiment.

The placement of the memory tag 500 according to the fourth exemplary embodiment is described. FIG. 23 is a bottom perspective view of the cartridge 10 according to the fourth exemplary embodiment. FIG. 24 is a cross-sectional view of the cartridge 10 along a C-C cross section in FIG. 23.

As illustrated in FIG. 24, the reception port cover 774 includes an opposing surface 774C opposed to the discharge port forming surface 94C of the toner container 9. The memory tag 500 is provided on the opposite side of the discharge port forming surface 94C with the opposing surface 774C as a boundary. Consequently, toner scattered by the work of replacing the toner container 9 is blocked by the opposing surface 774C. Thus, it is possible to prevent the memory tag 500 from becoming soiled.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A process cartridge to which a toner cartridge accommodating toner is detachably attached, the process cartridge comprising:

a photosensitive drum rotatable about a rotational axis;

a drum frame supporting the photosensitive drum so that the photosensitive drum is rotatable about the rotational axis;

a developing roller configured to supply toner to the photosensitive drum;

a developing frame having a toner storage portion configured to store the toner to be borne on the developing roller and provided with a reception port through which the toner is supplied to the toner storage portion from the toner cartridge; and a memory configured to store information about the process cartridge, wherein the reception port of the toner storage portion is provided in a first end portion of the process cartridge opposite to a second end portion of the process cartridge in a direction of the rotational axis, wherein the memory is provided outside an outermost end surface of the developing frame in the direction of the rotational axis on a side of the first end portion of the process cartridge, and wherein the memory is provided outside an outermost end surface of the drum frame in the direction of the rotational axis on the side of the first end portion of the process cartridge.

2. The process cartridge according to claim 1, wherein the outermost end surface of the developing frame is between the reception port and the memory in the direction of the rotational axis.

3. The process cartridge according to claim 1, wherein the memory is aligned with the toner cartridge in the direction of the rotational axis.

4. The process cartridge according to claim 1, further comprising:

a toner conveying screw provided in the toner container of the toner cartridge and configured to rotate so as to convey the toner toward the reception port, and a driving gear configured to transmit a driving force for a rotation of the toner conveying screw, wherein the driving gear is provided in the second end portion of the process cartridge.

5. The process cartridge according to claim 4, further comprising:

a coupling configured to receive the driving force from an outside of the process cartridge and to transmit the driving force to the driving gear, the coupling being provided in the second end portion of the process cartridge.

6. The process cartridge according to claim 1, further comprising:

an operation lever configured to move between a first position in which the operation lever prevents the toner cartridge from being detached from the developing frame and a second position in which the operation lever allows the toner cartridge to be detached from the developing frame, the operation lever being provided in the second end portion of the process cartridge.

7. The process cartridge according to claim 6, wherein the drum frame includes a drum supporting portion by which the photosensitive drum is rotatably supported and a lever supporting portion by which the operation lever is rotatably supported, wherein the drum supporting portion and the lever supporting portion are provided at third and fourth end portions of the drum frame, respectively, in a direction perpendicular to the rotational axis, and wherein the memory is provided closer to the lever supporting portion than to the drum supporting portion in the direction perpendicular to the rotational axis.

8. The process cartridge according to claim 6, wherein the toner cartridge is configured to be attached to the developing frame by a rotation of the toner container in a first rotational direction about a second rotational axis extending in the direction of the rotational axis, and when the operation lever is in the first position, the operation lever prevents the toner container from being rotated in a second rotational direction opposite to the first rotational direction about the second rotational axis, and wherein the operation lever is configured to be operated to rotate the toner container in the second rotational direction by being rotated from the first position to the second position.

9. The process cartridge according to claim 8, wherein the toner cartridge includes a shutter movable with respect to the toner container between an open position in which the shutter opens the reception port and a closed position in which the shutter closes the reception port, and wherein the shutter is moved from the closed position to the open position by a rotation of the toner container in the first rotational direction.

* * * * *